(12) United States Patent
Shirai et al.

(10) Patent No.: US 7,098,997 B2
(45) Date of Patent: Aug. 29, 2006

(54) SURVEYING SYSTEM

(75) Inventors: Masami Shirai, Saitama (JP); Shinobu Uezono, Saitama (JP); Koji Tsuda, Saitama (JP); Atsumi Kaneko, Tokyo (JP); Ryota Ogawa, Saitama (JP); Takeshi Mimura, Saitama (JP); Tetsuya Kata, Saitama (JP); Kenichi Nakamura, Chiba (JP)

(73) Assignee: PENTAX Corporation, Tokyo (JP)

( * ) Notice: Subject to any disclaimer, the term of this patent is extended or adjusted under 35 U.S.C. 154(b) by 309 days.

(21) Appl. No.: 10/602,862

(22) Filed: Jun. 25, 2003

(65) Prior Publication Data

US 2004/0234123 A1    Nov. 25, 2004

(30) Foreign Application Priority Data

Jun. 26, 2002   (JP)   ............... P2002-185686
Jun. 27, 2002   (JP)   ............... P2002-188125

(51) Int. Cl.
   *G01C 3/00*   (2006.01)
   *G01C 3/08*   (2006.01)
   *G01C 5/00*   (2006.01)

(52) U.S. Cl. ............ 356/3.01; 356/3.01; 356/3.1; 356/4.01

(58) Field of Classification Search ............ 356/3.01
   See application file for complete search history.

(56) References Cited

U.S. PATENT DOCUMENTS

| 5,579,165 | A  | * | 11/1996 | Michel et al. ............... 359/630 |
| 6,144,761 | A  |   | 11/2000 | Kaneko et al. |
| 6,304,669 | B1 | * | 10/2001 | Kaneko et al. ............... 382/154 |
| 6,487,517 | B1 | * | 11/2002 | Sakai et al. ................. 702/158 |
| 6,600,511 | B1 |   | 7/2003  | Kaneko et al. |
| 6,618,497 | B1 |   | 9/2003  | Nakayama |
| 6,618,498 | B1 |   | 9/2003  | Nakayama |
| 2001/0023766 | A1 | * | 9/2001 | Ohtomo et al. ............... 172/4.5 |
| 2002/0007303 | A1 | * | 1/2002 | Brookler et al. ............. 705/10 |

FOREIGN PATENT DOCUMENTS

| JP | 11325883 | | 11/1999 |
| JP | 11337336 | | 12/1999 |
| JP | 2001133263 | * | 4/2001 |
| JP | 3261359 | * | 12/2001 |

OTHER PUBLICATIONS

English Language Translation of JP Appln. No. 11-325883.
English Language Translation of JP Appln. No. 11-337336.
English Language Translation of JP Appln. No. 3-261359.
A portion of Sokia Update, Jul. 2002, with an English Language Translation of the highlighted portion.

* cited by examiner

*Primary Examiner*—Thomas H. Tarcza
*Assistant Examiner*—Luke D. Ratcliffe
(74) *Attorney, Agent, or Firm*—Greenblum & Bernstein, P.L.C.

(57) ABSTRACT

A surveying system that comprises a position relation calculating processor, a correspondence establishing processor, and an image processor is provided. The position relation calculating processor calculates a positional relation between a coordinate system to which measurement information of a measurement point refers and an image of a surveying field, where a staking point is included. The correspondence establishing processor establishes correspondence between three-dimensional position information of the staking point and two-dimensional position information of a point corresponding to the staking point on the schematic image. The image processor superimposes a symbol that indicates the position of the staking point on the schematic image in accordance with the above correspondence.

36 Claims, 26 Drawing Sheets

FIG. 17

| NAME | X-COMPONENT | Y-COMPONENT | Z-COMPONENT |
|---|---|---|---|
| Q-1 | 100.000 | 100.002 | 9.000 |
| Q-2 | 102.002 | 102.213 | 15.000 |
| Q-3 | 105.211 | 102.033 | 10.202 |

SURVEYING SYSTEM

BACKGROUND OF THE INVENTION

1. Field of the Invention

The present invention relates to a surveying system, for which staking out or laying off can be carried out. Further, the invention also relates to a surveying system, which can also process measurement information within the system.

2. Description of the Related Art

In conventional route surveying or site surveying, which involves staking out operations, at least two persons are required. Namely, one person operates a surveying instrument provided with a staking out function, while the other person searches for a staking point with a target, such as a prism or the like. Position data for a plurality of given points, where substantial or actual positions are known, and staking points are pre-installed in a surveying instrument, such as a total station or the like. For example, the surveying instrument is positioned at a second given point with respect to a direction from a first given point, known as a back sight direction. The horizontal angle and the horizontal distance from the instrument point to a staking point with respect to the first given point is indicated on the surveying instrument. The person with the prism or target should stand at about a position that is expected to be near an objective staking point, while the other person measures the position of the prism or target, with the surveying instrument and detects the difference from the position of the objective staking point, so as to instruct the person with the prism or target which direction the prism or target should be moved, by using two-way or gestures. This operation is repeated until the difference between the target and the position of a preset staking point becomes sufficiently small for the two points to be regarded as at equal positions, so that a stake is properly positioned. Further, when a recently developed surveying instrument with an automatic sighting function is used, the above explained staking out surveying can be achieved by one person. Namely, the surveying instrument automatically aims at the prism or target that is held by one staking operator and instructs the operator regarding which direction to move, by sending measurement data via a wireless telecommunication system or through optical signals. The staking operator may seek the given staking point with reference to the transmitted measurement data or the optical signals and move the prism or target.

However, the above surveying operations involving one or two people are cumbersome and require time, since a staking operator is lead to a given staking point by using words and gestures, so that the position of a staking point is not clear for the staking operator. Even when using an automatic sighting surveying instrument, it is still difficult to obtain a proper position of a staking point visually and spatially, so that searching for a given staking point is difficult. Further, when there are a substantial number of measurement points, an unmeasured measurement point might be confused with a measurement point that has already been measured.

Further, in conventional surveying or measurement practice, a picture or image of a surveying area including stations (points which are to be measured) may be taken and recorded with the measurement data on some occasions. On these occasions, an image of a surveying area may be photographed with a separate normal camera not associated with the surveying instruments or with an imaging device integrally installed inside the surveying instruments, as described in Japanese unexamined patent publication No. 11-337336. In this publication, images are captured for each of the measurement points.

However, when an image is taken with a separate normal camera, measurement points are not indicated on the image, so that it is impossible for a user to identify the points on the image that correspond to each of the measurement points. On the other hand, when utilizing a surveying instrument disclosed in the above unexamined patent publication '336, a large-capacity memory is required, since images are captured and stored for each of the measurement points, which in turn causes operating difficulties for a user.

SUMMARY OF THE INVENTION

Therefore, a general object of the present invention is to improve the efficiency of surveying. In particular, the present invention aims to provide a device, a system, and a program product that enables cooperation between measurement information obtained by a surveying instrument and image information of a surveying area which is obtained by an imaging device. Accordingly, visual and spatial recognition of measurement points (stations) or staking points can be easily obtained.

According to the present invention, a surveying system is provided that comprises a position relation calculating processor, a correspondence establishing processor, and an image processor.

The position relation calculating processor calculates a positional relation between a coordinat system to which measurement information of a measurement point refers and an image of a surveying field which includes the staking point. The correspondence establishing processor establishes correspondence between three-dimensional position information of the staking point and two-dimensional position information of a point corresponding to the staking point on the schematic image. The image processor superimposes a symbol for indicating the position of the staking point on the schematic image in accordance with the above correspondence.

Further, according to the present invention, a personal digital assistant, which is used in a surveying system, is provided. The surveying system comprises a position relation calculating processor that calculates a positional relation between a coordinate system to which measurement information of a measurement point refers and an image of a surveying field which includes a staking point, and a correspondence establishing processor that establishes correspondence between the three-dimensional position information of the staking point and two-dimensional position information of a point corresponding to the staking point on the schematic image. The personal digital assistant comprises an image processor that superimposes a symbol for indicating the position of the staking point on the schematic image in accordance with the above correspondence.

Further, according to the present invention, a digital camera is provided that comprises an imaging device, a position relation calculating processor, a correspondence establishing processor, and an image-indicating device.

The imaging device captures a schematic image of a surveying field which includes a staking point, for staking out surveying with a surveying instrument. The position relation calculating processor calculates a positional relation between the schematic image and the surveying instrument in accordance with the two-dimensional position information of a plurality of arbitrary designated control points on the schematic image, and either of three-dimensional measurement information of the plurality of control points or previously obtained measurement information. Further, the correspondence establishing processor establishes correspondence of the three-dimensional measurement information of a measurement point measured by the surveying instrument to the two-dimensional position information on the schematic image which corresponds to the measurement point. Further, the correspondence establishing processor establishes correspondence of three-dimensional position information of the staking point to two-dimensional position information on the schematic image which corresponds to the staking point. The image-indicating device indicates positions of the measurement point and the staking point on the schematic image, in accordance with the above correspondence.

Further, according to the present invention, a surveying support device is provided that comprises a position relation calculating processor, and a correspondence establishing processor.

The position relation calculating processor calculates the position relation between a schematic image of a surveying field which includes a staking point, to be staked by using a surveying instrument, and the surveying instrument. The correspondence establishing processor establishes correspondence of three-dimensional measurement information of a measurement point, measured by the surveying instrument, to the two-dimensional position information on the schematic image which corresponds to the measurement point. Further, the correspondence establishing processor establishes correspondence of the three-dimensional measurement information of three-dimensional position information of the staking point, to the two-dimensional position information on the schematic image which corresponds to the staking point. Positions of the measurement point and the staking point are indicated on the schematic image in accordance with the above correspondence.

Further, according to the present invention, a computer program product for supporting surveying is provided. The program calculates the positional relation between a schematic image of a surveying field including a staking point and a surveying instrument. It also calculates the correspondence of the three-dimensional measurement information of a measurement point measured by the surveying instrument, to the measurement point. Further it calculates the correspondence of the three-dimensional measurement information of three-dimensional position information of the staking point, to the two-dimensional position information on the schematic image, which corresponds to the staking point. Finally, it indicates positions corresponding to the measurement point and the staking point on the schematic image in accordance with the above correspondence.

Further, according to the present invention, a surveying method is provided. The method comprises a step of capturing a schematic image of a surveying field including a staking point. The method also comprises a step of a calculating relation between the schematic image and a surveying instrument. Further, the method comprises a step of indicating the position of the staking point on the schematic image, a step of measuring the three-dimensional measurement information of a target by the surveying instrument in order to carry out the staking out of the staking point, and a step of indicating a position of the staking point on the schematic image, in accordance with the relation calculated in a previous step, for guiding the target to the staking point.

Further, according to the present invention, a surveying system is provided that comprises a position relation calculating processor, a correspondence establishing processor, an image indicating device, a measurement point indicating processor, and a degeneracy informing processor.

The position relation calculating processor calculates a positional relation between a coordinate system to which measurement information of measurement points refer and a schematic image of a surveying field, in which the schematic image includes the measurement points. The correspondence establishing processor establishes a correspondence between the measurement information of the measurement points and position information of points corresponding to the measurement points on the schematic image. The image-indicating device indicates the schematic image. The measurement point indicating processor indicates positions of the measurement points on the schematic image, which is displayed on the image-indicating device, in accordance with the above correspondence. The degeneracy informing processor gives the positions of degenerated measurement points, when the positions of the measurement points are degenerated on the schematic image displayed on the screen of the image-indicating device.

Further, according to the present invention, a surveying supporting device is provided that comprises a position relation calculating processor, a correspondence establishing processor, an image indicating device, a measurement point indicating processor, and a degeneracy informing processor.

The position relation calculating processor calculates a positional relation between a coordinate system to which measurement information of measurement points refers and a schematic image of a surveying field, in which the schematic image includes the measurement points. The correspondence establishing processor establishes a correspondence between the measurement information of the measurement points and position information of points corresponding to the measurement points on the schematic image. The image-indicating device indicates the schematic image. The measurement point indicating processor indicates positions of the measurement points on the schematic image, which is displayed on the image-indicating device, in accordance with the above correspondence. The degeneracy informing processor gives the positions of degenerated measurement points, when the positions of the measurement points are degenerated on the schematic image displayed on the screen of the image-indicating device.

Further according to the present invention, a computer program product for supporting surveying is provided. The program product carries out position relation calculation, correspondence calculation, schematic image indication, measurement points indication, and indication of the position of degenerated measurement points.

The position relation calculation is for calculating a positional relation between a coordinate system to which measurement information of measurement points refer and a schematic image of a surveying field, in which the schematic image includes the measurement points. The correspondence calculation is for calculating correspondence between the measurement information of the measurement points and the position information of points corresponding to the measurement points on the schematic image. The measurement points indication is for indicating positions of the measurement points on the schematic image, which is displayed on the image-indicating device, in accordance with the above correspondence. The process of indicating a position representing degenerated measurement points is carried out when the positions of the measurement points are degenerated on the schematic image displayed on the screen of the image-indicating device.

BRIEF DESCRIPTION OF THE DRAWINGS

The objects and advantages of the present invention will be better understood from the following description, with reference to the accompanying drawings in which:

FIG. 17 is a list of measurement points that is used for indication of measurement point degeneracy, in the third embodiment;

DESCRIPTION OF THE PREFERRED EMBODIMENTS

Figure 1:
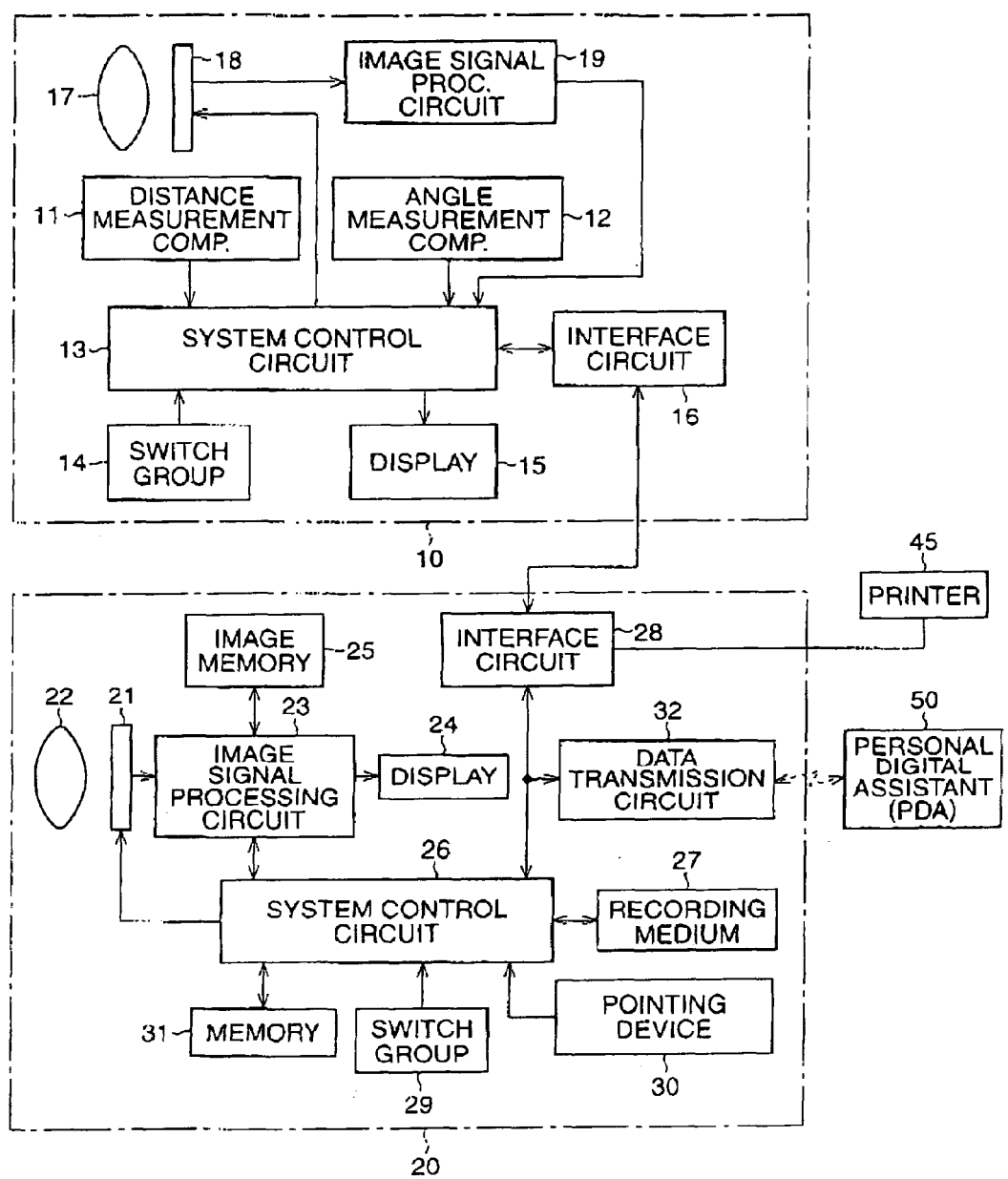
FIG. 1 is a block diagram showing a general electrical construction of a first embodiment of the present invention, which includes a surveying instrument and a camera.

The present invention is described below with reference to the embodiments shown in the drawings.

FIG. 1 is a block diagram showing a general electrical construction of a first embodiment of the present invention, which includes a surveying instrument and a camera.

A surveying instrument for the first embodiment may be a total station, an electronic tacheometer, or the like that comprises a distance measurement component 11 and an angle measurement component 12. The distance measurement component 11 is for measuring the oblique distance from the instrument to a measurement point. For example, the distance measurement is carried out by a phase modulation measurement method, a pulse radar method, or the like. At the same time, the angle measurement component 12 periodically or continuously detects angles, such as a horizontal angle and an vertical angle, for example. The distance measurement component 11 and the angle measurement component 12 are connected to a system control circuit 13, whereby they are controlled by signals from the system control circuit 13. For example, the distance measurement component 11 detects a distance in accordance with signals from the system control circuit 13, and outputs the detected data or measurement data to the system control circuit 13. On the other hand, the angle measurement component 12 continuously detects angles at a regular timing and outputs the detected data or measurement data to the system control circuit 13 when it is required. The detected data, such as an oblique distance, horizontal angle, and vertical angle, are processed in the system control circuit 13. The system control circuit 13 is also connected to an interface circuit 16, so that a digital still camera (DSC) 20, for example, may be connected to the interface circuit 16 through an interface cable. Note that, the interface circuit 16 is also available for other peripheral devices, such as a data collector, computer, and the like, which are not shown.

Further, the surveying instrument 10 comprises an imaging device 18, such as a CCD and the like, so that an image around a sighted point can be captured through a photographing lens 17. Image signals from the imaging device 18 are subjected to a predetermined image processing, such as a white balance compensation process, gamma correction process, and so on, and are then fed to the display 15 through the system control circuit 13 and may be displayed as a live view. Note that, the imaging device 18 is driven by control signals fed from the system control circuit 13. Further, a switch group 14 is connected to the system control circuit 13, so that signal processing in the system control circuit 13 is controlled according to switch operations by an operator.

Note that, the optical system of the sighting telescope 10a (see FIG. 3) of the surveying instrument 10, which is used for distance and angle measurement, may be used as an optical system of the photographing lens 17. With this construction, the viewing area of an image captured by the imaging device 18 will substantially coincide with the scope of the sighting telescope 10a.

An imaging device 21, such as a CCD, is installed inside the digital still camera 20, so that a subject image can be captured through a photographing lens 22. Namely, a subject image is detected as image signals by the imaging device 21 and the signals are fed to the image signal processing circuit 23. The image signals input to the image signal processing circuit 23 may be subjected to predetermined image processing, such as a RGB gain compensation process, white balance compensation process, gamma correction process, super imposing process, and the like. The signals, which were subjected to these processes, may be fed to the display 24 (e.g. LCD) and displayed as a live view. Further, when a release button (not shown), which is included in the switch group 29 connected to the system control circuit 26, is depressed, a subject image is then temporally stored in an image memory 25 as a digital image.

The digital image stored in the image memory 25 can be indicated on the display 24 via the image signal processing circuit 23. Further, it can be stored in a recording medium 27, such as an IC card, or an optical or magnetic recording medium, through the system control circuit 26. The digital image stored in the recording medium 27 can also be indicated on the display 24 under the control of the system control circuit 26 Further, the image captured by the digital still camera 20 can be transmitted to a computer (a peripheral device) as image data by connecting the digital still camera 20 to the computer through an interface circuit 28 in order to indicate the image.

The digital still camera further comprises a data transmission circuit 32 which is used to establish data communication with a personal digital assistant (PDA) 50, by means of wireless communication, for example by using radio or light signals. Namely, from the data transmission circuit 32, the image data stored in the image memory 25 can be transmitted to the PDA 50, which is provided with an image-indicating device, via the system control circuit 26.

A pointing device 30 is connected to the system control circuit 26, whereby an arbitrary point on the screen of the display 24 can be appointed. As the pointing device 30, cursor keys, a track ball, a joystick, touch screen, and so on, may be used. Further, the system control circuit 26 is connected to memory 31.

Figure 2:
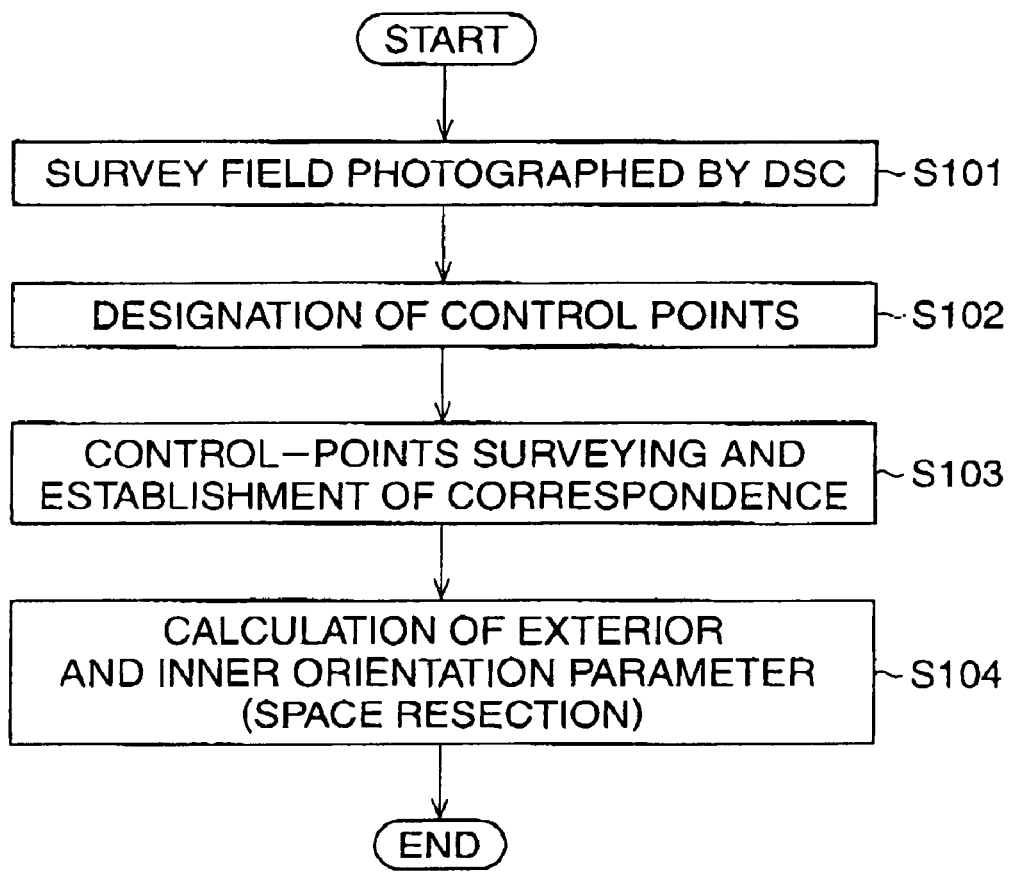
FIG. 2 is a flowchart of the single photograph orientation process in the surveying system of the first embodiment.
Figure 3:
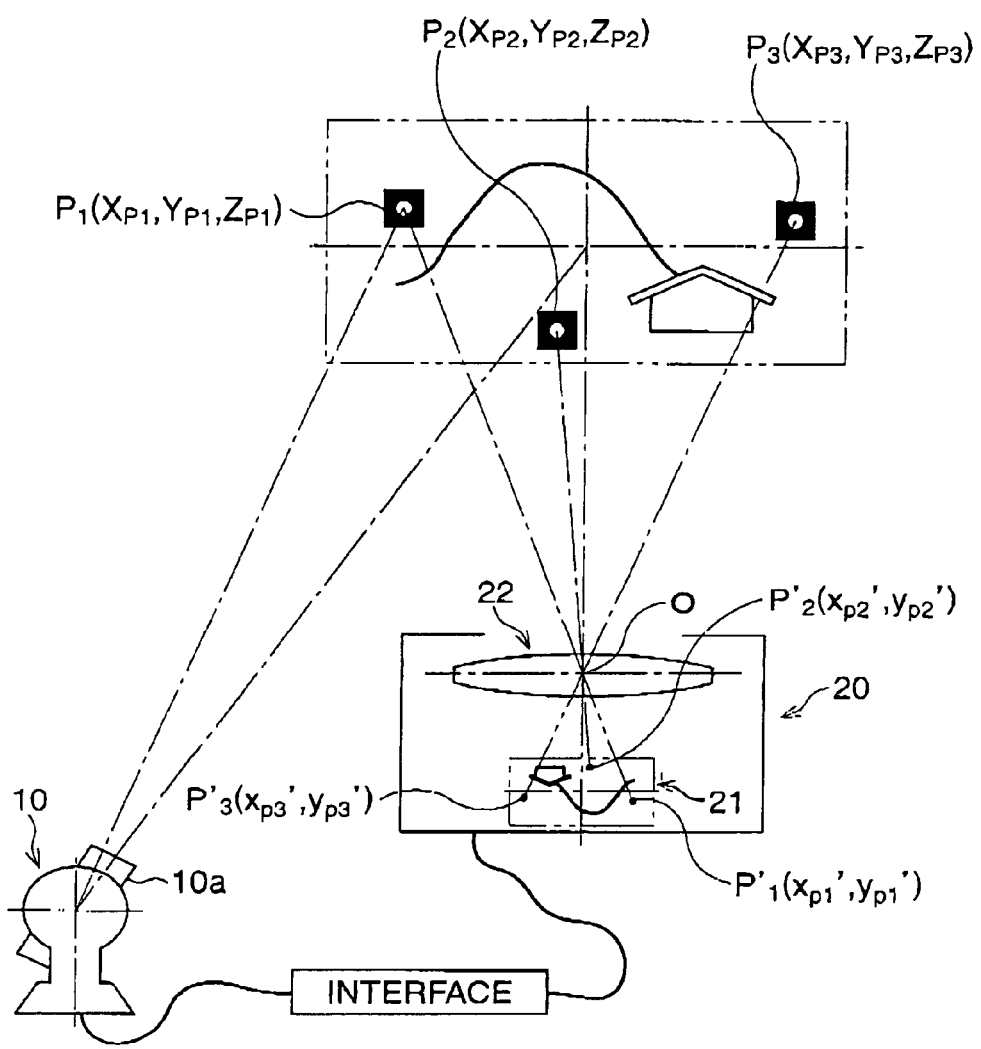
FIG. 3 schematically illustrates an arrangement of the surveying instrument and the camera.

With reference to FIG. 1, FIG. 2, and FIG. 3, a single photograph orientation process in the surveying system of the first embodiment will be described FIG. 2 is a flowchart of the single photograph orientation process in the surveying system of the first embodiment. FIG. 3 schematically illustrates an arrangement of the surveying instrument and the camera in the surveying system of the first embodiment.

At Step 101, an operator takes a picture or image around the surveying area with the digital still camera (DSC) 20. A plurality of measurement points, which are to be measured, is included within the above single digital image (referred to as a schematic image) taken by the digital still camera 20. In Step 102, the schematic image is indicated on the display 24 of the digital still camera 20, for example, and a plurality of points (or pixels) on the schematic image, points which are not aligned on the same line, are selected by the operator by using the pointing device 30. Namely, substantial points in the substantial or object space, which correspond to the selected pixels, are designated as control points $P_i$ (i=1, 2, ..., n), where a control point is a measurement point that is arbitrarily selected for calculating the orientation of a schematic image. At this time, the positions of image points $P_1'$ that correspond to each of the control points $P_i$ are derived as two-dimensional image coordinates $(xp_i', yp_i')$. Note that, the image coordinate system is a two-dimensional coordinate system of which the origin is at the upper left corner of the image with the y'-axis being positive in the downward direction. Note that, the number "n" of control points which are three dimensionally arranged, may be more than 11.

In Step S103, an oblique distance and the angles (such as an vertical and horizontal angle) of each control point $P_i$, which are appointed in Step S102, are measured by an operator by using the survey instrument 10. Measured values are then fed to the system control circuit 26 of the digital still camera 20 via the interface. At the system control circuit 26, three-dimensional coordinates $(Xp_i, Yp_i, Zp_i)$ for each of the control points $P_i$ are calculated in a predetermined surveying coordinate system. At this time, the correspondence between the surveying coordinates $(Xp_i, Yp_i, Zp_i)$ for each of the control points $P_i$ and the image coordinates $(xp_i', yp_i')$ for image points $P_i'$ is determined. Note that, the origin of the surveying coordinate system may be the intersection of the rotational axes for measuring the vertical and horizontal angles of the sighting telescope 10a (see FIG. 3) of the surveying instrument 10, and the absolute coordinates, including latitude and longitude or any type of positioning format defined by the relevant surveying authority, may be adapted to the above survey coordinates. Further, the surveying coordinates calculation may be carried out in the surveying instrument 10, and latter the calculated data may be sent to the system control circuit 26 of the digital still camera 20.

As will be explained in detail later, exterior orientation parameters for the digital camera 20, which represent the position and the inclination of the camera 20 at the moment when the schematic image was taken, are calculated in Step S104, in accordance with the correspondence between the surveying coordinates and the image coordinates for each of the control points $P_i$, by means of space resection. Further, inner orientation parameters for compensating for aberrations from the collinear condition due to lens distortion or displacement of the principal point from the image center may be calculated. Namely, the position or the surveying coordinates $(X_o, Y_o, Z_o)$ of the origin of the three-dimensional camera coordinate system, which is fixed in the digital still camera 20, and the rotational angle $(\omega, \phi, \kappa)$ about the x-axis, y-axis, and z-axis of the camera coordinate system, at the time, are derived as exterior orientation parameters. Further, the inner orientation parameters (f: distance from the center of projection for the lens or the principal distance; $D_2, D_4, D_6$: second, fourth, and sixth order components of the distortion; $N_1, N_2$: unsymmetrical components of distortion; $X_C, Y_C$: displacement of the principal point from the center of the image) are obtained. Thereby, the perspective projection relationship between the image coordinates and the surveying coordinates is established. Note that, when the inner orientation parameters are definite for the above $(f, D_2, D_4, D_6, N_1, N_2, X_C, Y_C)$, the number of control points required for calculating the exterior and inner orientation parameters is at least seven. Among these control points, at least three are required to calculate the exterior orientation parameters $(X_o, Y_o, Z_o, \omega, \phi, \kappa)$. Note that, in the present embodiment, eleven (or more) control points are appointed to calculate of the exterior and inner orientations.

Note that, the camera coordinate system is a left-handed coordinate system of which the origin "O" is located at the center of the lens or the center of the projection, and in which the y-axis and z-axis are parallel to each of the s'-axis and t'-axis of the screen coordinate system. Further, the x-axis of the camera coordinate system is normal to the imaging surface and is oriented to the side opposite to the imaging surface from the center of the projection. Namely, when the principal distance of the photographing lens 22 is "f", any point on the imaging surface is represented by the camera coordinates (−f,y,z). Here, the screen coordinate system is a two-dimensional coordinate system of which the origin is defined at the principal point with each of the s'-axis and t'-axis arranged in parallel with each of the x'-axis and y'-axis, that is, in parallel with each of the horizontal and vertical lines of the imaging device 21 (see FIG. 4).

As described above, the single photograph orientation process of the present embodiment ends.

Figure 4:
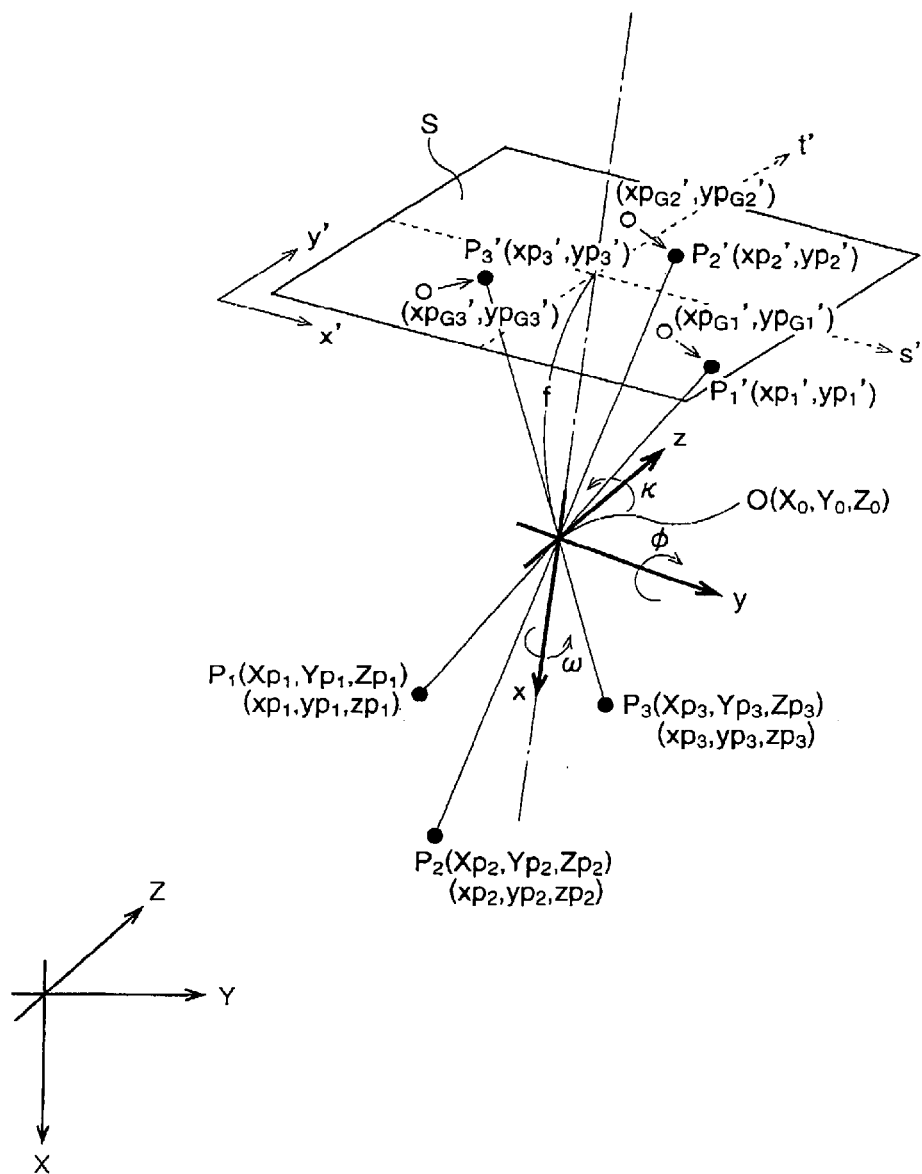
FIG. 4 schematically illustrates the relations between th control points and the corresponding image points on the imaging surface.
Figure 5:
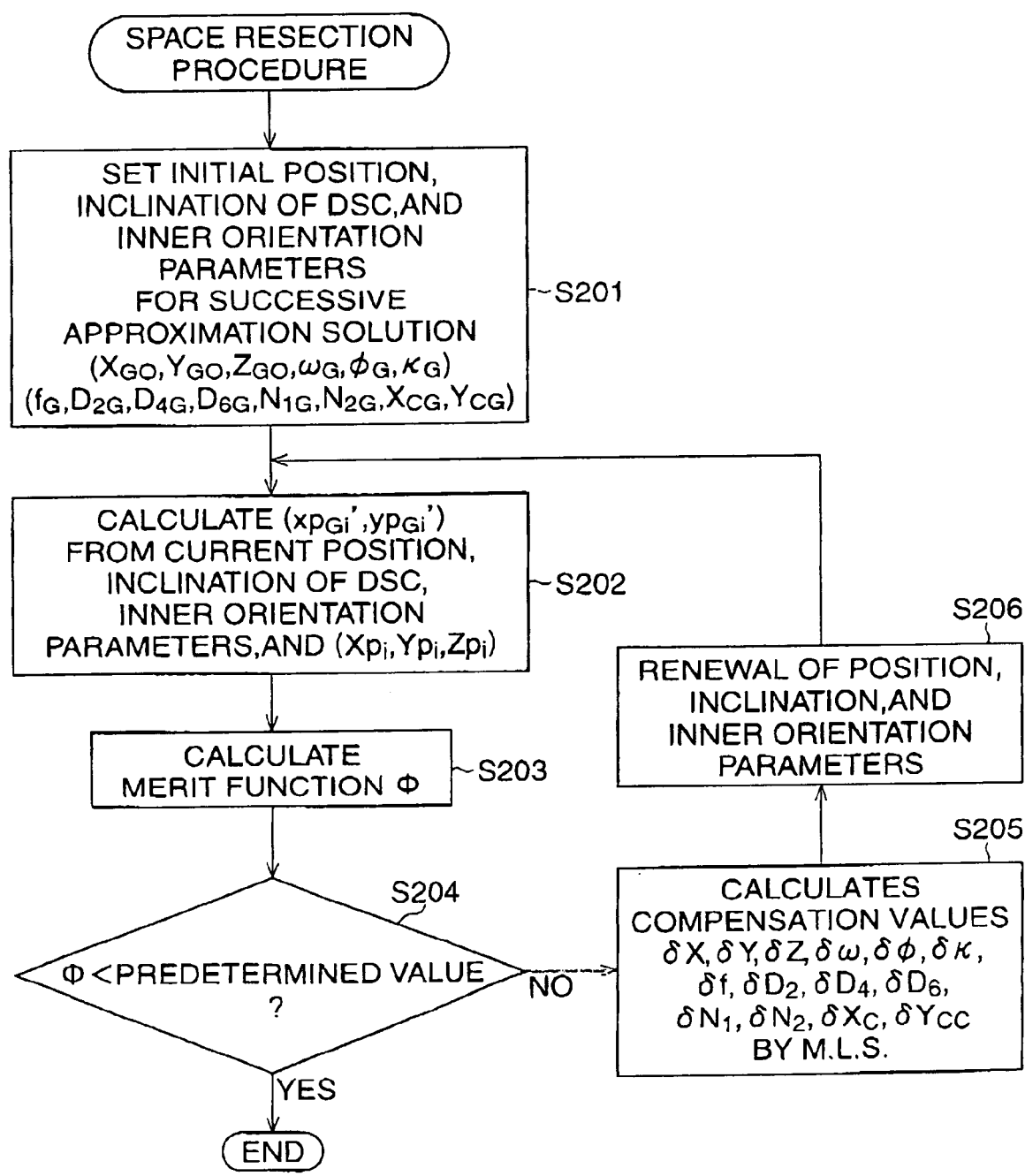
FIG. 5 is a flowchart of the space resection program that calculates exterior orientation parameters and inner orientation parameters.

With reference to FIG. 4 and FIG. 5, a principle for obtaining the exterior orientation parameters (position and the inclination) and the inner orientation parameters of the digital still camera 20, by space resection (Step S104), will be explained.

FIG. 4 schematically illustrates the relations between the three control points $P_1$, $P_2$, and $P_3$, and the corresponding image points $P_1'$, $P_2'$, and $P_3'$ on the imaging surface S. FIG. 5 is a flowchart of the space resection program that calculates exterior orientation parameters $(X_o, Y_o, Z_o, \omega, \phi, \kappa)$, which represent the position and the inclination of the digital still camera 20, and inner orientation parameters $(f, D_2, D_4, D_6, N_1, N_2, X_C, X_C)$ which depend on the optical system of the camera 20. For the space resection calculation, a least square method including a successive approximation solution is applied. Note that, although it is acceptable for the number of control points to be seven or more, here, a case when eleven points are designated for the control points, is explained, as an example. However, for convenience, only three control points $P_1$, $P_2$, and $P_3$ are illustrated in FIG. 4.

In Step 201, appropriate initial values $(X_{GO}, Y_{GO}, Z_{GO}, \omega_O, \phi_G, \kappa_G)$ and $(f_G, D_{2G}, D_{4G}, D_{6G}, N_{1G}, N_{2G}, X_{CG}, Y_{CG})$ are given as approximate values for the exterior orientation parameters $(X_o, Y_o, Z_o, \omega, \phi, \kappa)$, representing the position and the inclination of the camera, and the inner orientation parameters $(f, D_2, D_4, D_6, N_1, N_2, X_C, Y_C)$. Then in Step S202, approximate image coordinates $(xp_{Gi}', yp_{Gi}')$ of the image point $P_i'$ (i=1,2, . . . ,11), which correspond to each of the eleven control points $P_i$, are calculated from the surveying coordinates $(X_i, Y_{pi}, Zp_i)$ of the respective control points $P_i$, by using the given exterior orientation parameters $(X_{GO}, Y_{GO}, Z_{GO}, \omega_C, \phi_C, \kappa_C)$ and inner orientation parameters $(f_G, D_{2G}, D_{4G}, D_{6G}, N_{1G}, N_{2G}, X_{CG}, Y_{CG})$. Namely, the coordinates $(xp_i, yp_i, zp_i)$ of the control points $P_i$ (i=1,2,3) in the camera coordinate system are derived from coordinates $(Xp_i, Yp_i, Zp_1)$ of the surveying coordinate system by Eq. (1), thereby, approximate camera coordinates $(xp_{Gi}, yp_{Gi}, zp_{Gi})$ of the control points $P_i$ are obtained by substituting the approximate exterior orientation parameters $(X_{GO}, Y_{CO}, Z_{GO}, \omega_G, \phi_G, \kappa_G)$ and the surveying coordinates $(xp_i, yp_i, zp_i)$ of the control points $P_i$ into Eq. (1).

$$\begin{pmatrix} xp_i \\ yp_i \\ zp_i \end{pmatrix} = \begin{pmatrix} T_{11} & T_{12} & T_{13} \\ T_{21} & T_{22} & T_{23} \\ T_{31} & T_{32} & T_{33} \end{pmatrix} \begin{pmatrix} Xp_i - X_0 \\ Yp_i - Y_0 \\ Zp_i - Z_0 \end{pmatrix} \quad (1)$$

where $\{T_{jk}\}$ represents a rotational matrix, and each of the elements $T_{jk}$ are described in the following forms.

$T_{11} = \cos \phi \cdot \cos \kappa$
$T_{12} = \cos \omega \cdot \sin \kappa + \sin \omega \cdot \sin \phi \cdot \cos \kappa$
$T_{13} = \sin \omega \cdot \sin \kappa - \cos \omega \cdot \sin \phi \cos \kappa$
$T_{21} = -\cos \phi \cdot \sin \kappa$
$T_{22} = \cos \omega \cdot \cos \kappa - \sin \omega \cdot \sin \phi \sin \kappa$
$T_{23} = \sin \omega \cdot \cos \kappa + \cos \omega \cdot \sin \phi \cdot \sin \kappa$
$T_{31} = \sin \phi$
$T_{32} = -\sin \omega \cdot \cos \phi$
$T_{33} = \cos \omega \cdot \cos \phi$ The screen coordinates $(sp_i', tp_i')$ of the image point $P_i'$ corresponding to the control points $P_i$, which have not being yet been compensated by the inner orientation parameters, are derived from the collinear condition (wherein a control point, the center of projection, and the corresponding image point are aligned on the same line). Therefore, the uncompensated screen coordinates $(sp_i', tp_i'')$ are calculated by introducing the exterior orientation parameters $(X_o, Y_o, Z_o, \omega, \phi, \kappa)$ and the camera coordinates $(xp_i, yp_i, zp_i)$ of control points $P_i$ into the following Eq. (2).

$$sp_i' = -f \frac{yp_i}{xp_i} \quad (2)$$

$$= -f \frac{T_{21}(Xp_i - X_0) + T_{22}(Yp_i - Y_0) + T_{23}(Zp_i - Z_0)}{T_{11}(Xp_i - X_0) + T_{12}(Yp_i - Y_0) + T_{13}(Zp_i - Z_0)}$$

$$tp_i' = -f \frac{zp_i}{xp_i}$$

$$= -f \frac{T_{31}(Xp_i - X_0) + T_{32}(Yp_i - Y_0) + T_{33}(Zp_i - Z_0)}{T_{11}(Xp_i - X_0) + T_{12}(Yp_i - Y_0) + T_{13}(Zp_i - Z_0)}$$

Although, the uncompensated screen coordinates $(sp_i', tp_i')$ are affected by distortion, the effect is compensated for by substituting the screen coordinates $(sp_i', tp_i')$ of each image point $P_i'$ and the approximate inner orientation parameters $(f_G, D_{2G}, D_{4G}, D_{6G}, N_{1G}, N_{2G}, X_{CG}, Y_{CG})$ into the following Eq. (3). Namely, compensated approximate screen coordinates $(scp_{Gi}', tcp_{Gi}')$ are obtained.

$$R^2 = sp_i'^2 + tp_i'^2$$

$$scp_i' = sp_i'(1 + D_2 R^2 + D_4 R^4 + D_6 R^6) + (R^2 + 2sp_i'^2)N_1 + 2sp_i' tp_i' N_2 + X_C \quad (3)$$

$$tcp_i' = tp_i'(1 + D_2 R^2 + D_4 R^4 + D_6 R^6) + 2sp_i' tp_i' tp_i' N_1 + (R^2 + 2tp_i'^2)N_2 + Y_C$$

Further, approximate image coordinates $(xp_{Gi}', yp_{Gi}')$ of the image points $P_i'$ can be derived by substituting the compensated approximate screen coordinates $(scp_{Gi}', tcp_{Gi}')$ into the following Eq. (4).

$$xp_i' = scp_i'/(-Px) + W/2$$

$$yp_i' = tcp_i'/Py + H/2 \quad (4)$$

where Px and Py are the pixel pitches of the CCD or the image in the horizontal and vertical directions respectively, and W and H are the numbers of pixels in the CCD or the image, which are aligned in the horizontal and vertical directions respectively.

In Step S203, a merit function $\Phi$ is calculated in order to determine whether the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are appropriate. For example, the merit function $\Phi$ is determined by the following Eq. (5).

$$\Phi = \sum_{i=1}^{11} \{(xp_i' - xp_{Gi}')^2 + (yp_i' - yp_{Gi}')^2\} \quad (5)$$

Namely, in the present embodiment, the merit function $\Phi$ corresponds to the total amount of squared distances between the image coordinates $(xp_i', yp_i')$ of image points $P_i'$ corresponding to the control points $P_i$ (which are selected in the schematic image), and the approximate image coordinates $(xp_{Gi}', yp_{Gi}')$ of the image points $P_i'$ calculated from the surveying coordinates $(Xp_i, Yp_i, Zp_i)$ of the control points $P_i$ and the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$.

Then, whether the merit function is smaller than a predetermined value is determined, in Step S204. That is, whether the approximate image coordinates $(xp_{Gi}', yp_{Gi}')$ of the image points $P_i'$, which are obtained from the approximately given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$, are sufficiently close to the image coordinates $(xp_i', yp_i')$ of the image points $P_i'$ corresponding to the control points $P_i$, which are designated on the schematic image, is determined. When the value $\Phi$ is smaller than the predetermined value, this process is terminated and the values of the presently given exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are determined as the exterior and inner orientation parameters that represent the exterior orientation parameters (which indicate position and the inclination of the camera) and inner orientation parameters when the schematic image was captured On the other hand, when the value of $\Phi$ is determined to be larger or equal to the predetermined value, in Step S204, then in step S205, compensation values $(\delta X, \delta Y, \delta Z, \delta \omega, \delta \phi, \delta \kappa, \delta f, \delta D_2, \delta D_4, \delta D_6, \delta N_1, \delta N_2, \delta X_C, \delta Y_c)$ for the approximately given exterior orientation parameters $(X_{GO}, Y_{GO}, Z_{GO}, \omega_G, 100_G, \kappa_G)$ and inner orientation parameters $(f_G, D_{2G}, D_{4G}, D_{GG}, N_{1G}, N_{2G}, X_{CG}, Y_{CG})$ are calculated by using the least squares method, for example. Namely, $(scp_i', tp_i')$ of Eq. (3) are substituted for $(sp_i', tp_i')$ of Eq. (2), which represents the collinearity condition. Eq. (2) is then subjected to Taylor's expansion at the approximate exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ and the higher order terms are neglected so as to linearize the formula. Accordingly, the normal equations, for which the compensation values $(\delta X, \delta Y, \delta Z, \delta \omega, \delta \phi, \delta \kappa)$ and $(\delta f, \delta D_2, \delta D_4, \delta D_6, \delta N_1, \delta N_2, \delta X_C, \delta Y_c)$ regarded as unknown values, are derived in order to obtain the appropriate compensation values $(\delta X, \delta Y, \delta Z, \delta \omega, \delta \phi, \delta \kappa)$ and $(\delta f, \delta D_2 \delta D_4, \delta D_6, \delta N_1, \delta N_2, \delta X_C, \delta Y_c)$.

In Step S206, the approximate exterior orientation parameters $(X_{GO}, Y_{GO}, Z_{GO}, \omega_G, \phi_G, \kappa_G)$ and inner orientation parameters $(f_G, D_{2G}, D_{4G}, D_{6G}, N_{1G}, N_{2G}, X_{CG}, Y_{CG})$ are altered by the compensation values $(\delta X, \delta Y, \delta Z, \delta \omega, \delta \phi, \delta \kappa)$ and $(\delta f, \delta D_2, \delta D_4, \delta D_6, \delta N_1, \delta N_2, \delta X_C, \delta Y_c)$ which are obtained in Step S205. That is, each of the values $(X_{GO}, Y_{GO}, Z_{GO}, \omega_G, \phi_G, \kappa_G)$ and $(f_G, D_{2G}, D_{4G}, D_{6G}, N_{1G}, N_{2C}, X_{CG}, Y_{CG})$ is replaced by the values $(X_{GO}+\delta X, Y_{GO}+\delta Y, Z_{GO}+\delta Z, \omega_G+\delta \omega, \phi_G+\delta \phi, \kappa_C+\delta \kappa)$ and $(f_G+\delta f, D_{2G}+\delta D_2, D_{4G}+\delta D_4, D_{6G}+\delta D_6, N_{1G}+\delta N_1, N_{2G}+\delta N_2, X_{CG}+\delta X_C, Y_{CG}+\delta Y_C)$ to thereby renew or compensate the position, inclination, and inner orientation parameters of the camera. Then the process returns to Step S202, so that Steps S202 through S206 are repeated until the value $\Phi$ is determined to be smaller than the predetermined value in Step S204.

Figure 6:
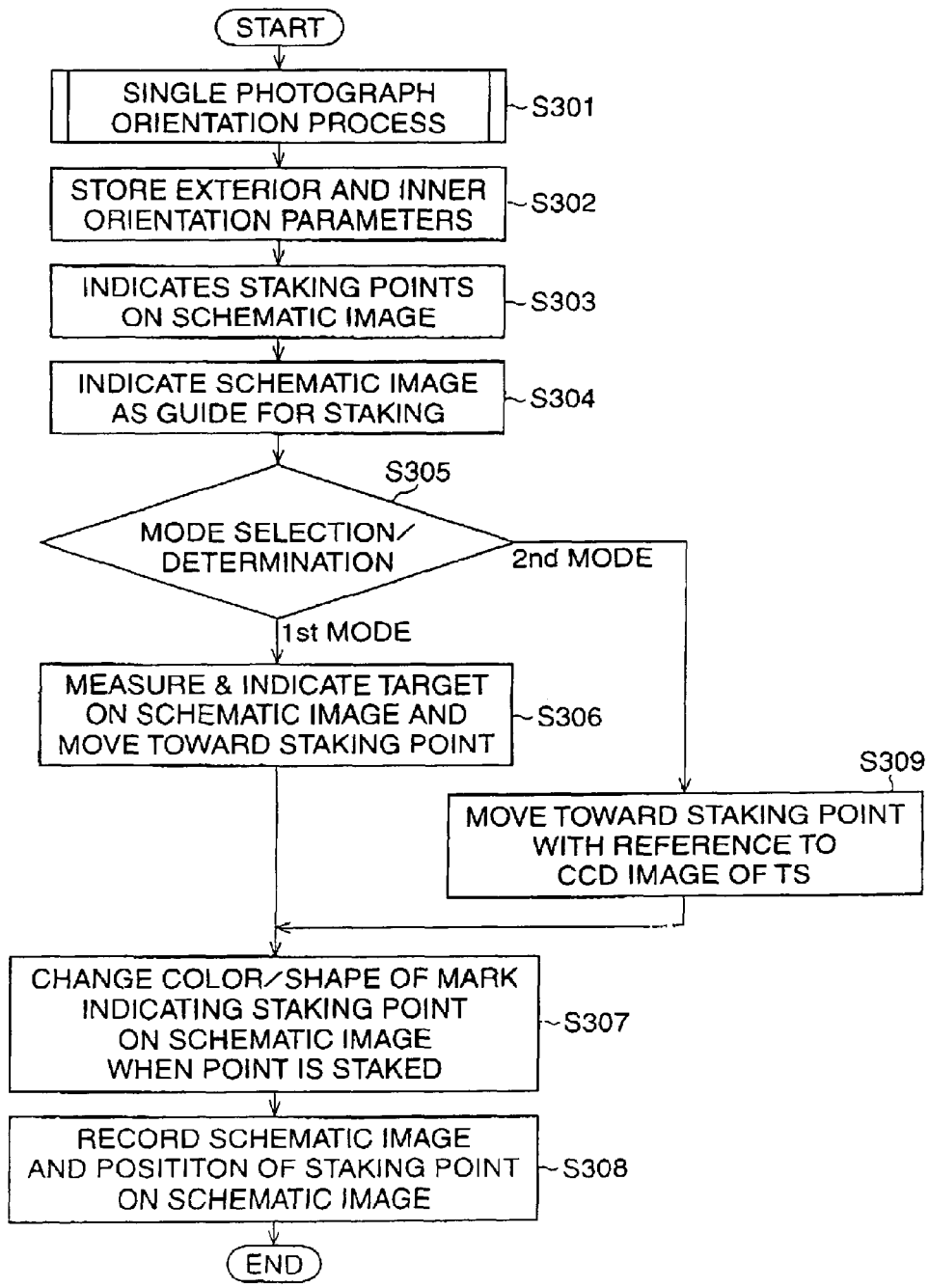
FIG. 6 is a flowchart of the staking out surveying operations carried out in the surveying system of the first embodiment.
Figure 7:
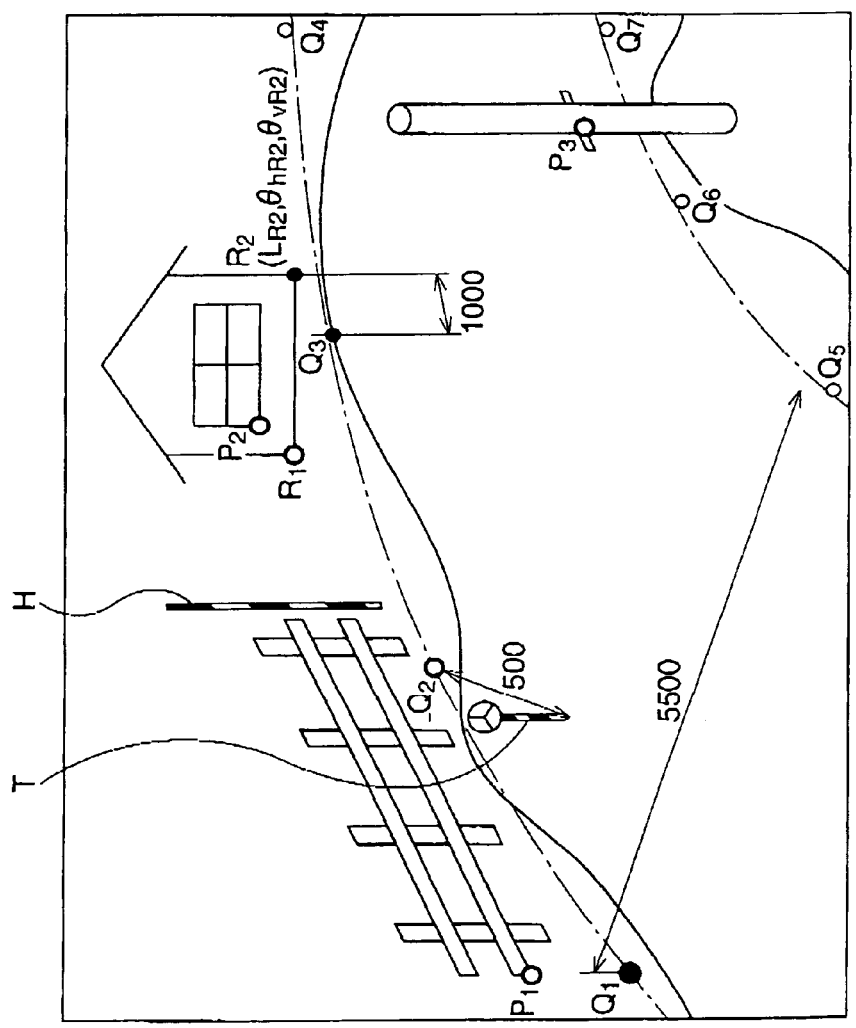
FIG. 7 schematically illustrates an example of image indication in the first mode surveying.

With reference to FIG. 1, FIG. 6, and FIG. 7, the staking out surveying method using the surveying system of the first embodiment will be explained.

FIG. 6 is a flowchart of the staking out surveying operations carried out in the surveying system of the present embodiment. In Step S301, the single photograph orientation process described in the flowchart of FIG. 2 is carried out. Note that, a schematic image, which is captured in Step S101 of FIG. 2, is taken so that it includes staking points. The exterior orientation parameters $(X_o, Y_o, Z_o, \omega, \phi, \kappa)$ and the inner orientation parameters $(f, D_2, D_4, D_6, N_1, N_2, X_C, Y_C)$ of the digital still camera 20, which are calculated by the single photograph orientation process, are stored in the recording medium 27 or the memory 31, in Step S302, for example.

In the recording medium 27 or memory 31, the position data of the staking points $(Q_1, Q_2, \ldots, 1Q_7)$ which are planned or designed (the position data may be input via the keyboard by an operator whenever it is required) is stored. In Step S303, the image coordinates that correspond to the position data of the staking points are calculated from the exterior orientation parameters $(X_o, Y_o, Z_o, \omega, \phi, \kappa)$ and the inner orientation parameters $(f, D_2, D_4, D_6, N_1, N_2, X_C, Y_C)$ so that marks, symbols (e.g. a circle), or names (including numbers), which are used to indicate the position of each staking point and to distinguish each from another, are displayed on the schematic image, as shown in FIG. 7. Further, the configuration or size of a mark or symbol representing a staking point may be formed dissimilar to the other measurement points (for example, a staking point may be indicated by an empty circle, while other measurement points may be indicated by empty triangles, and control points by double circles). Further, a mode that indicates the position data of a staking point, beside the mark or symbol of a staking point, may be provided. Note that, the relations between the position of the surveying instrument and the position of staking points are obtained from the position data of given points (e.g. and marks or boundary posts), where substantial or actual positions are known. For example, when the position data of a staking point and given points are described in the same coordinate system, and the relations between at least two given points (or one given point and its direction) and the surveying instrument are known (by using the surveying instrument, for example), the position data of the staking point can be represented by the surveying coordinate system, so that the relation between the position data of the staking points and the exterior orientation parameters are obtained.

In Step S304, the schematic image indicated on the display 24 is transmitted to the PDA 50, which is carried by a staking operator, via the data transmission circuit 32, so that the transmitted schematic image is indicated on the display of the PDA 50. The staking operator with a target (e.g. a prism) can move toward the objective staking point, which has been searched, with reference to the schematic image displayed on the PDA 50.

In Step S305, a mode for searching the staking point is selected or determined. The system in the present embodiment comprises a first mode and a second mode that support searching a staking point, which will be detailed later. For example, either one of the first mode or second mode may be selected by a predetermined mode selecting switch (not shown) in the switch group 29 by an operator.

When the operator selects the first mode in Step S305, or when the first mode has already been selected, the process proceeds to Step S306. The target, which is held by the staking operator, is sighted by the surveying instrument and its position is measured. The measurement data of the target is transmitted to the digital still camera 20 from the surveying instrument 10. Thereby, a symbol "T" that indicates the target is superimposed on the schematic image at a point corresponding to the target. At the same time, the distance (e.g. 500) between an objective staking point (e.g. $Q_2$), which has been searched, and the target, is indicated by using a predetermined unit (e.g. mm). Further, a direction toward which the target or staking operator should move may be indicated by an arrow that starts from the target "T" to the staking point $Q_2$, for example. Furthermore, the position data of the staking points and the target may be indicated beside their respective symbols as belonging to a certain coordinate system (e.g. surveying coordinates or absolute coordinates). The measurement of the target may be successively executed in turn at a predetermined interval so as to feed back the varying position of the target to the surveying instrument 10. Thus the latest position of the target is constantly and properly indicated on the schematic image.

The indications on the schematic image are transmitted to the PDA 50 and displayed. The staking operator proceeds with the surveying operation in reference to the schematic image on which the above symbols are superimposed, and moves the target toward the staking point until the distance between the staking point and the target turn out to be smaller than a predetermined value. Note that, when the surveying instrument 10 is provided with an automatic sighting mechanism, the sight of the sighting telescope automatically follows the moving target carried by a staking operator, in Step S306. On the other hand, when the surveying instrument 10 does not comprise an automatic sighting mechanism, at least two operators are required to carry out the surveying operation, so that one operator is always required to sight the surveying instrument on the target.

When the distance between the target and the staking point becomes smaller than the predetermined value, that is when it is determined that the staking point is searched, a predetermined switch in the switch group 29 is operated in Step S307 and the staking out operation ends. For example, the color, shape, size, and so on, of the symbol of the staking point, which has just been staked, are then renewed (e.g. a white empty circle may be replaced by a red circle as the staking point $Q_1$ of FIG. 7, or may be replaced by a triangle which is not depicted). Further, these changes may be automatically executed in accordance with signals from the surveying instrument 10, when the above distance is smaller than the above predetermined value. The above change or renewal may be automatically made by the digital still camera 20 when the position of the symbol "T" of the target falls within a certain range of the staking position, and the change is independent on the above-predetermined value.

Further, between the given or planned positional value of a staking point and the substantial position where the staking pole was staked, there exists an error in the precision. However, the indicating position of the symbols, when the staking out surveying is complete, can be settled at either of the planned position or the substantial position that is measured. In either case, the color, shape, and size of the symbols are renewed at the position which is settled. Thereby, a staking point, for which the staking out surveying is complete, can be visually confirmed on the schematic image.

In Step S308, information relating to the three-dimensional position of a staking point superimposed on the schematic image, information relating to the two-dimensional position of the staking point on the image, and flag information for determining the completion of the staking out surveying, may be combined with the image data of the schematic image when required, and stored in a file or a plurality of files that are associated as a group, in the recording medium 27. Accordingly, the staking out surveying operation ends.

On the other hand, when the second mode is selected in Step S305, or when the second mode has already been selected, the process proceeds to Step S309. In Step S309, similar to Step S306, the target, which is held by the staking operator, is sighted by the surveying instrument and its position is measured Further, an image, including the target in the sighting direction and the objective staking point to be searched, is captured by the imaging device 18 which is mounted inside the surveying instrument 10. The image data of the captured image and the measurement data of the target are transmitted to the digital still camera 20 from the surveying instrument 10. Thereby, a symbol "T" that indicates the target is superimposed on the schematic image on the display 24 at a point corresponding to the target. Further, the magnified image S captured by the surveying instrument 10 is also superimposed on the schematic image.

Figure 8:
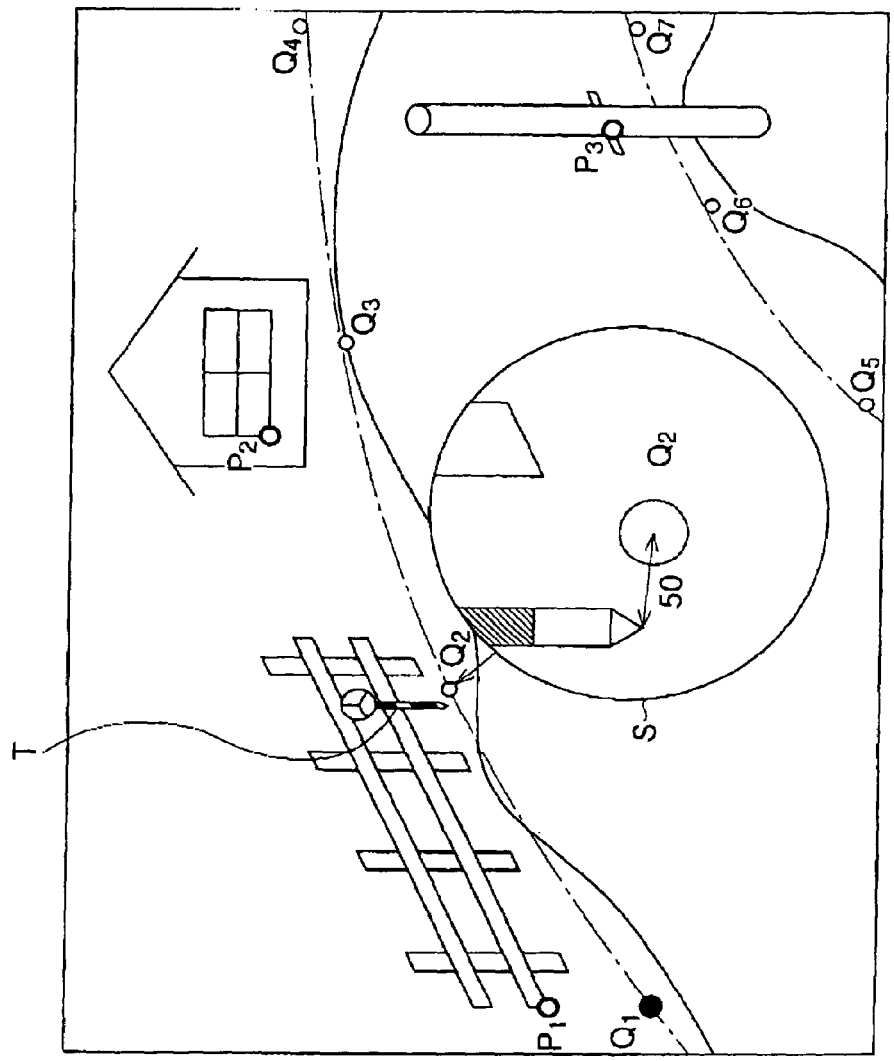
FIG. 8 schematically illustrates an example of image indication in the second mode surveying.

In FIG. 8, an example of the schematic image indicated on the display 24 at the above stage is depicted. The magnified image S is an image that is telephotographed about the target and the distance (e.g. 500 given in a predetermined unit e.g. mm) between an objective staking point (e.g. $Q_2$), which has been searched, and the target is indicated in the magnified image S. Further, a direction toward which the target or S staking operator should move may be indicated by an arrow that points from the target "T" to the staking point $Q_2$, for example. Furthermore, the position data of the staking point and the target may be indicated beside their respective symbols for a specific coordinate system (e.g. surveying coordinates or absolute coordinates).

Similar to Step S306, the above composite image is transmitted to the PDA 50, which is carried by a staking operator, and displayed, so that the staking operator searches the objective staking point with reference to the image and the position data indicated on the display of the PDA 50. When the distance between the target and the staking point becomes smaller than a predetermined value, that is, when it is determined that the staking point is searched, a predetermined switch in the switch group 29 is operated in Step S307 and the staking out operation ends. For example, the color, shape, size, and so on, of the symbol of the staking point, which has just been staked, are then renewed (e.g. a white empty circle may be replaced by a red circle as the staking point $Q_1$ of FIG. 7, or may be replaced by a triangle which is not depicted).

Further, these changes may be automatically executed in accordance with the signals from the surveying instrument 10, when the above distance is smaller than the above predetermined value. The above change or renewal may also be made by the digital still camera 20 automatically when the position of the symbol "T" of the target falls within a certain range about the staking position, and that is independent to the above-predetermined value.

Further, between the given or planned positional values of a staking point and the substantial position, where the staking pole was staked, there exists an error in the precision. However, the indicating position of the symbols, when the staking out surveying is complete, can be set at either the planned position or the substantial position that was measured. In the either case, the color, shape, and size of the symbol are renewed at the position which is set. The previously described Step S308 is then performed and the staking out surveying operation is terminated. Note that, when carrying out the staking out surveying for other staking points, Step S304 and its following steps are repeated.

The present invention can be applied to both non-prism type distance measurement instruments and prism type distance measurement instruments. In the case of the non-prism type instruments, the surveying operation can be carried out in a similar way to that in the above-described embodiment, except for Steps S306 and S309. Further, the efficiency of the surveying can be improved by using the reflection from an object to function as a guide to sight a staking point, as will be explained below.

For example, when the first mode is selected in the flowchart of FIG. 6, an arbitrary point (e.g. a point on the ground surface which reflects measurement light), where the surveying instrument is sighted, is surveyed so that the position on the schematic image corresponding to the above measured point is indicated as a mark for the staking point, in the step corresponding to Step S305. Therefore, the staking out surveying operation is made efficient by carrying out the operation in which the mark is regarded as a sighting guide for the surveying instrument 10, and with reference to the displacement of the mark from the given staking point. Further, the measurement of the target may be successively executed at a predetermined interval (or continuously), so that the indication of the mark on the schematic image, at the point corresponding to the measured point, may be used as a sighting guide. Further, some non-prism type surveying instruments comprise a laser pointing device, so that the laser pointing device may be used to guide the sighting. Namely, the staking operator nearby the staking point can easily find the position of the staking point with reference to a spot pointed out by the laser beam. The operations in the second mode are same as the first mode, other than the magnified image captured by the imaging device mounted inside the surveying instrument is usable. Note that, in the present embodiment, a symbol or mark for a staking point and for a normal measurement point should be distinguishable form each other, so that, a normal measurement point may be represented by the symbol "+", of which the color, shape, or size is dissimilar to a staking point symbol.

As shown in FIG. 7, in the surveying system of the present embodiment, not only the target "T" but also arbitral measurement points (e.g. $R_1$ and $R_2$) may be measured by the surveying instrument 10, in Steps, S306 or S309, so that their position can be indicated on the schematic image. Further, position data to be indicated on the schematic image in Steps S306 or S309, and which correspond to each of the staking points ($Q_1, Q_2, \ldots, Q_7$), target (T), measurement points ($R_1, R_2$), may be represented by the horizontal angle θh, altitude θv, and oblique distance L. In this case, the horizontal angle θh may be defined with respect to a base line H (horizontal angle base line) that is arbitrary designated by using an input device, such as a pointing device 30.

In the present embodiment, three-dimensional coordinates (e.g. surveying coordinates) of staking points and measurement points, which are already measured, are corresponded to image coordinates of the schematic image. Therefore, the surveying system of the present embodiment is provided with functions that calculate and indicate data which is related to the relations among a plurality of points, i.e. distance between two arbitrary points selected by the pointing device 30, such as the distance between staking points (e.g. Q1 and Q2), the distance between a staking point and a measurement point (e.g. $Q_3$ and $R_2$), and the like. Note that, the distance to be calculated or indicated is not restricted to oblique distance but may be surveying information, such as horizontal distance, height difference, and so on. Further, the system may be provided with functions that calculate and indicate secondary surveying information, such as total distance among a plurality of continuing staking points or measurement points, and area, volume, or angles that are designated by three or more points.

Figure 9:
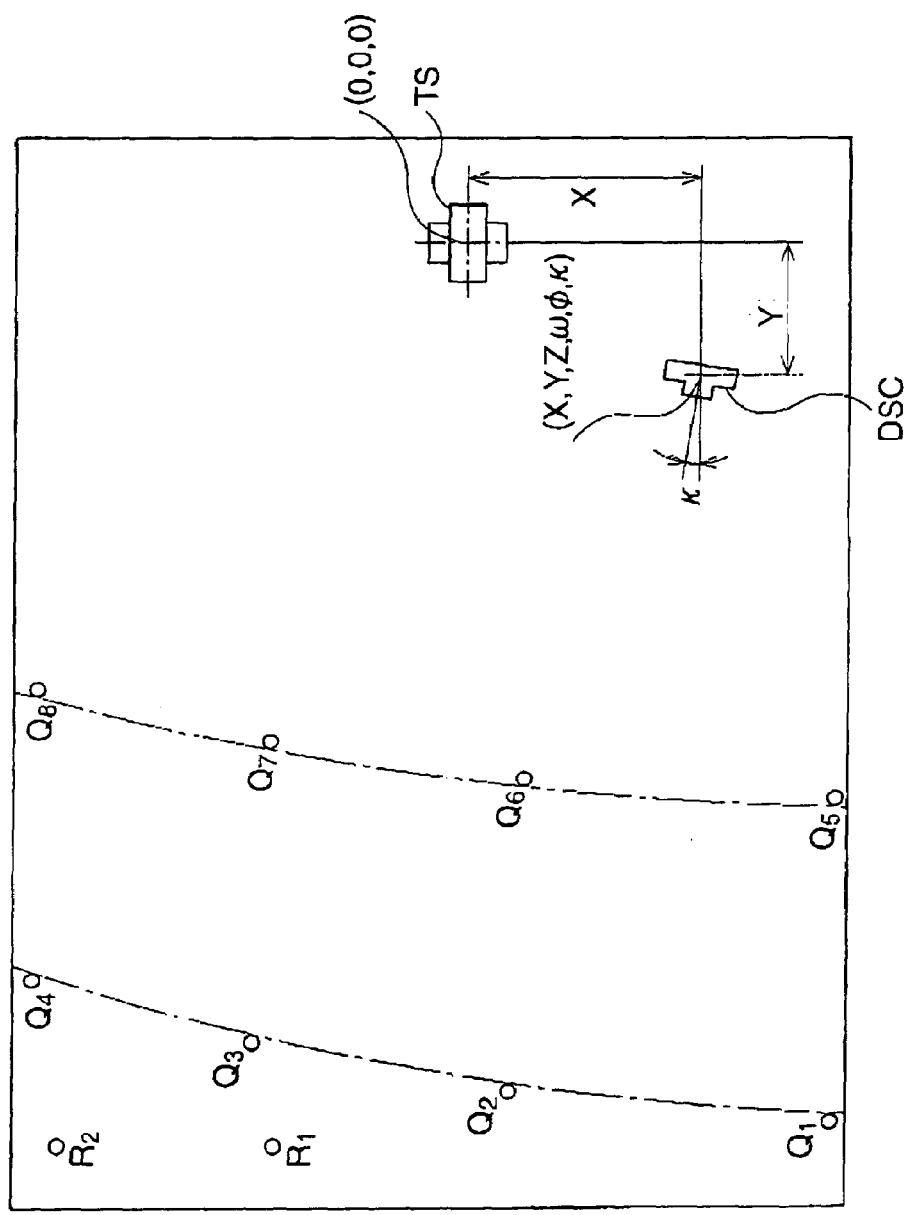
FIG. 9 schematically illustrates an example of image indication when the arrangement of measurement points, the surveying instrument, and the camera is displayed in a plan view.

Further, the surveying system of the present embodiment is provided with a function to indicate the relations between the position of the camera which captured the schematic image, the position of the surveying instrument, the position of the staking points and measurement points, and the like, as an arrangement in a horizontal plane, as described in FIG. 9. At this time, the exterior orientation parameters of the digital still camera (DSC) 20 with respect to the surveying instrument (TS) 10 may be displayed on the screen. Note that, the plan view image of FIG. 9 may be displayed on the screen in place of a schematic image, when a certain operation is given to a predetermined switch in the switch group 29 or on the PDA 50, in Step S306 and Step S309. Further, the plan view image can be stored in the recording medium 27 in Step S308. Note that, on this occasion, the plan view image may be stored in the recording medium 27 so as to be included in the same group with the schematic image.

As described above, according to the first embodiment of the present invention, surveying information obtained by a surveying instrument can be easily and properly combined with positions within a schematic image captured by a camera, so that the position of a target with respect to a staking point is easily, visually, and spatially recognized by an operator on the schematic image or the plan view image. Therefore, a staking out surveying operation can be carried out quite efficiently. Further, secondary surveying information (e.g. distance, area, volume, angle, and so on) based on all sorts of relations among staking points and measurement points can be obtained by pointing out the staking points and measurement points on the screen.

Further, in the first embodiment, exterior and inner orientation parameters can be calculated easily and swiftly, even when the digital still camera used in the surveying is not a camera for measurement, and its inner orientation parameters are not known as a result of a zoom function or focusing function Note that, the digital still camera may be connected to a printer 45 and the schematic image or plan view image, which is indicated on the display, may be printed, so that the surveying operation may be carried out with reference to the printed image.

Distortion, which is described as being part of the inner orientation parameters, is sufficiently small to neglect, when a lens with a long focal length, such as a telephoto lens, is used for capturing a schematic image. Namely, the parameters ($D_2, D_4, D_6, N_1, N_2$) of the inner orientation parameters can be neglected, so that the parameters (f,$X_C$,$Y_C$) only remain as unknown inner orientation parameters. Five three-dimensionally arranged control points $P_i$ are enough for obtaining the inner orientation parameters (f,$X_C$,$Y_C$). Further, when the displacement of the principal point from the image center is negligible, that is when unsymmetrical components of the distortion and the fourth and sixth order components of the distortion are negligible, the inner orientation parameters to be obtained are the parameters (f,$D_2$), so that four control points are sufficient to carry out the inner orientation. As described above, when the number of inner orientation parameters is small, the number of control points required for the inner orientation is reduced thereby time and labor for surveying are reduced.

Note that, although in the present embodiment, the digital still camera 20 is arbitrary positioned with respect to the surveying instrument 10, the digital still camera 20 may be arranged at a position that is optically equivalent with the position of the sighting telescope 10a (see FIG. 3) of the surveying instrument 10 by providing a device for mounting the camera onto the surveying instrument 10. In this case, the number of the control points can be reduced, since the number of unknown exterior orientation parameters is reduced. Further, when the digital still camera is arranged at a position that is optically equivalent with the position of the sighting telescope 10a, the surveying instrument may be a device that merely carries out angular measurement, such as a theodolite.

Next, with reference to FIG. 10, a surveying system of a second embodiment of the present invention will be explained. For the most part, the second embodiment is similar to the first embodiment, therefore only those things that are dissimilar to the first embodiment will be explained. Note that, the components which are common with those of the first embodiment will be referred to using the same numerals.

Figure 10:
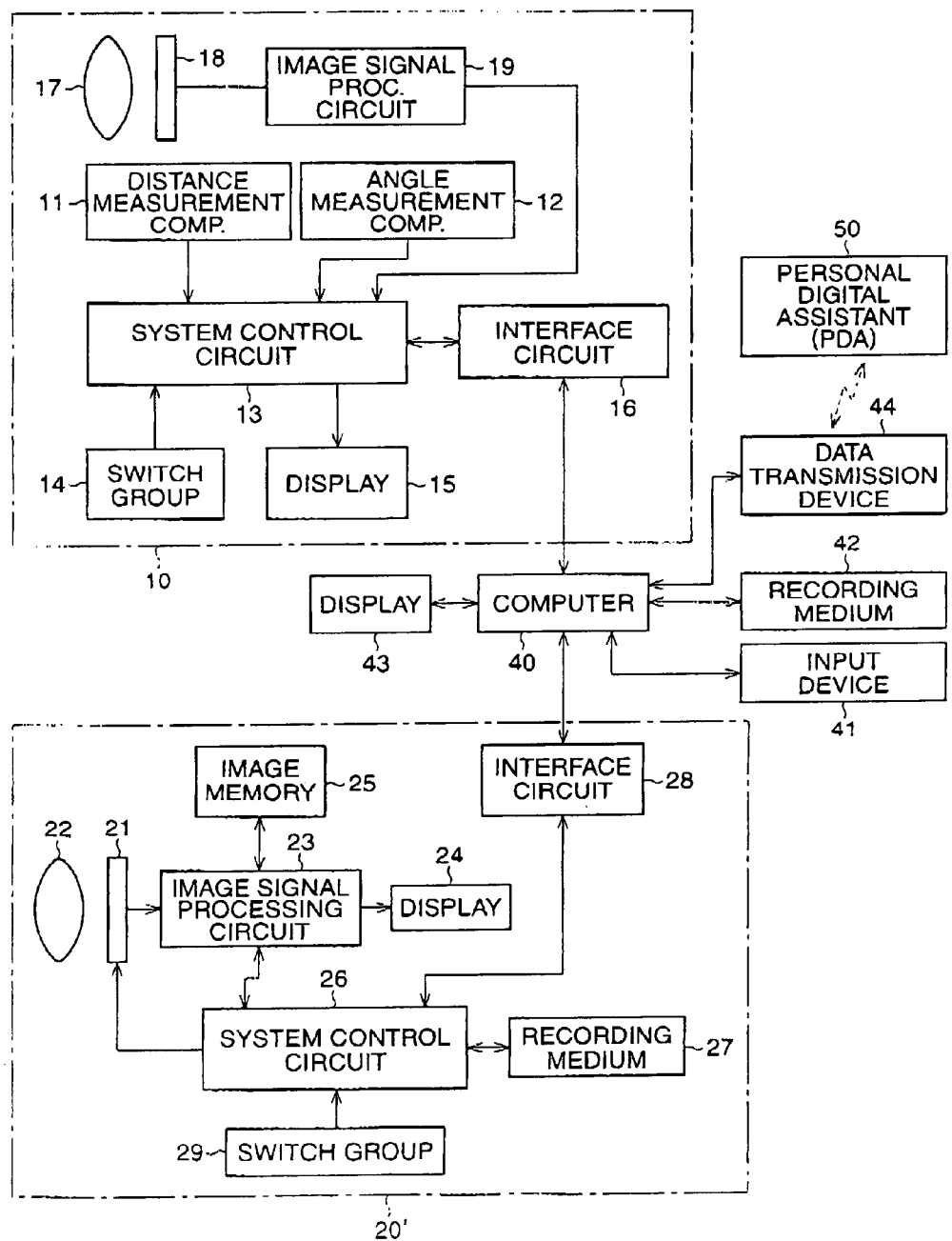
FIG. 10 is a block diagram that schematically shows a construction of the surveying system in the second embodiment.

FIG. 10 is a block diagram showing a general electrical construction of the surveying system of the second embodiment. In the second embodiment, a common digital still camera 20' available on the market, for example, is used for capturing a schematic image of a surveying area or surveying field. At first, the digital still camera 20' is connected to a computer 40 via an interface cable. An example of the computer 40 is a notebook sized personal computer (PC). A schematic image of the surveying area, which is taken by the digital still camera 20', is then transmitted to the computer 40. Finally, the computer 40 is connected to the surveying instrument 10 via an interface cable. An input device 41, such as a mouse, trackball, joystick, and keyboard are connected to the computer 40. Likewise, a recording medium 42, such as a hard disk, DVD, MO, IC card, and the like, are connected to the computer 40. Further, a display 43, such as LCD, CRT, and so on, and a data transmission device 44 are also connected the computer 40. The data transmission device 44 establishes data communication with a personal digital assistant (PDA) 50 (which is carried by a staking operator), by means of wireless communication, such using radio or light signals.

Image data of the schematic image sent to the computer 40 may be recorded in the recording medium 42. The schematic image is displayed on the display 43 by a surveying-support program installed in the computer 40. The processes that are described in the steps up to Step S102 of FIG. 2 are carried out by the surveying-support program using the surveying instrument 10 and the computer 40, thus the single photograph orientation process for the schematic image is carried out. Namely, an operator designates a plurality of points (pixels), which are in three-dimensional arrangement, as control points $P_i$ on the schematic image displayed on the display 43 by using a pointing device included in the input device 41. The position of the designated control points $P_i$ are then measured or surveyed by the surveying instrument 10. The surveying-support program then calculates the exterior orientation parameters ($X_o$,$Y_o$,$Z_o$,$\omega$,$\phi$,$\kappa$) and the inner orientation parameters (f,$D_2$,$D_4$,$D_6$,$N_1$,$N_2$,$X_C$,$Y_C$) of the digital still camera 20' (the parameters at the time when the schematic image is captured) in accordance with the image coordinates of the image points $P_i'$ of the control points $P_i$, and the surveying coordinates of the control points $P_i$ which are obtained from the measured values. As a result, the projection relations between the image coordinates and the surveying coordinates are established. The surveying-support program receives the measurement data of the staking points or measurement points detected by the surveying instrument, from the surveying instrument 10, and displays marks or measured values that indicate the position of the staking points or measurement points on the schematic image (which is displayed on the display 43) with reference to the established projection relations. Further, the measurement data, captured image data, inner orientation parameters, exterior orientation parameters, and so on, are associated with each other and recorded in the recording medium 42.

In the computer 40, the processes in the steps following Step S302 of FIG. 6 are carried out in a similar manner to the first embodiment, in accordance with data communications with the surveying instrument 10, so that the produced image data is transmitted to the PDA 50.

As described above, according to the second embodiment, an effect similar to that in the first embodiment is obtained. Further, in the second embodiment, a common digital still camera available on the market can be used. Although, the system may be structured as an exclusive apparatus for supporting surveying, the surveying-support program of the present Embodiment can be installed in an ordinary computer (e.g. a portable personal computer, such as notebook sized personal computer), so that the above-described surveying system can be easily provided at a low cost.

Although, in the second embodiment, the computer and the surveying instrument are separate, the computer system may be integrated with the surveying instrument.

With reference to FIG. 11 to FIG. 16, a surveying system of a third embodiment of the present invention will be explained.

Figure 11:
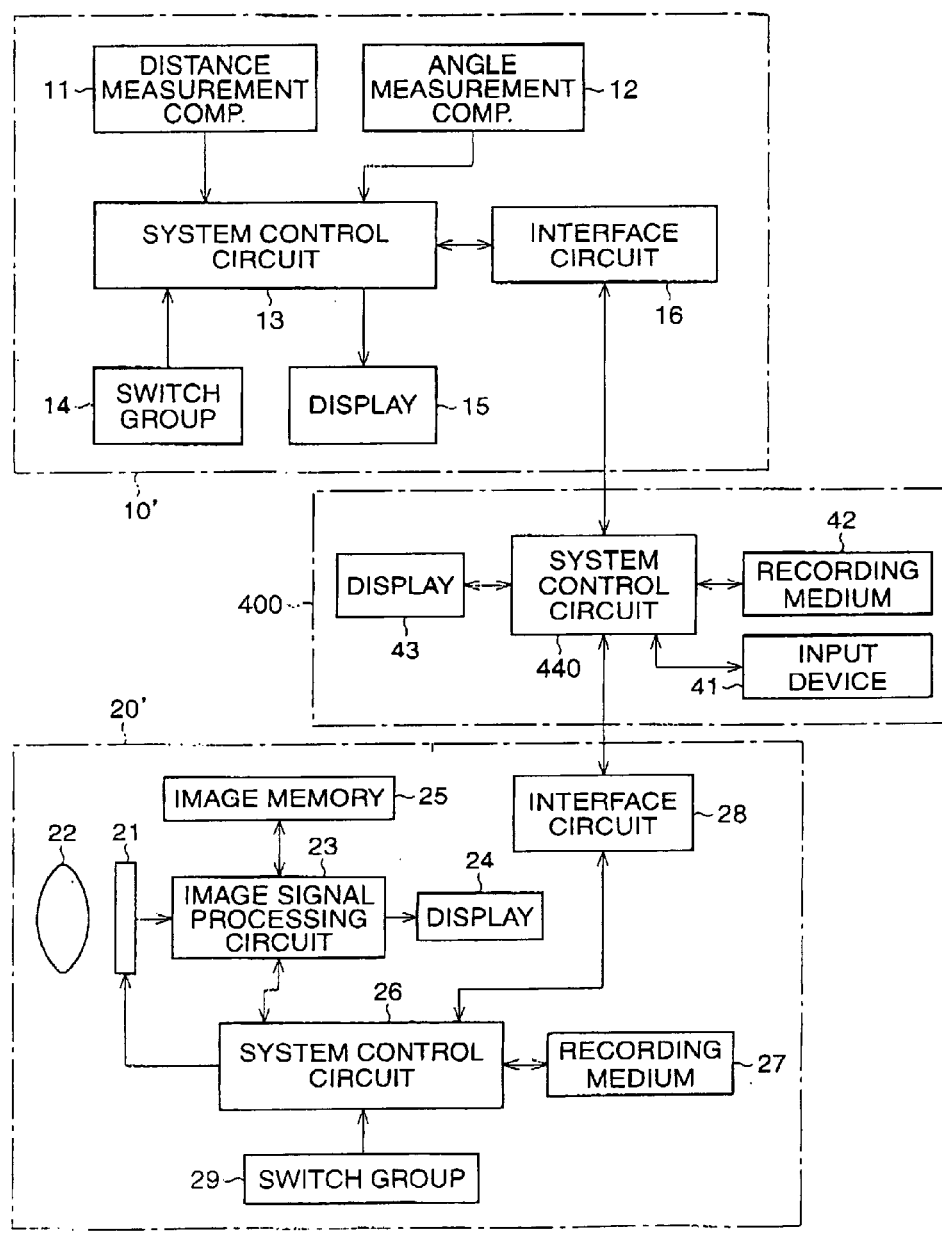
FIG. 11 is a block diagram that schematically shows an electrical construction of the surveying system of the third embodiment.

FIG. 11 is a block diagram showing a general electrical construction of the third embodiment of the present invention, which includes a surveying instrument and a camera. The general electrical construction of the surveying system of the third embodiment is similar to the construction of the second embodiment, so that only those parts that are dissimilar to the second embodiment are explained in the following.

The surveying system comprises a surveying instrument 10', such as a total station, a digital still camera 20', and a surveying-support device 400. The difference between the surveying instrument 10 of the second embodiment and the surveying instrument 10' of the third embodiment is that the surveying instrument 10' does not comprise an image capturing system while the surveying instrument 10 comprises an image capturing system, i.e. the lens 17, imaging device 18, and image signal processing circuit 19. Further, the surveying-supporting device 400 may be a notebook sized computer (PC) or PDA, which comprises an input device 41, a recording medium 42, the display 43, and a system control circuit 440 (which corresponds to the computer 40 of the second embodiment). The other components are the same as those in the second embodiment.

Note that, although the surveying-supporting device 400 also comprises an interface circuit, it is not depicted in FIG. 11. Further, a surveying-support program, which will be detailed latter, is pre-installed in the recording medium 42 of the surveying-supporting device 400.

Figure 12:
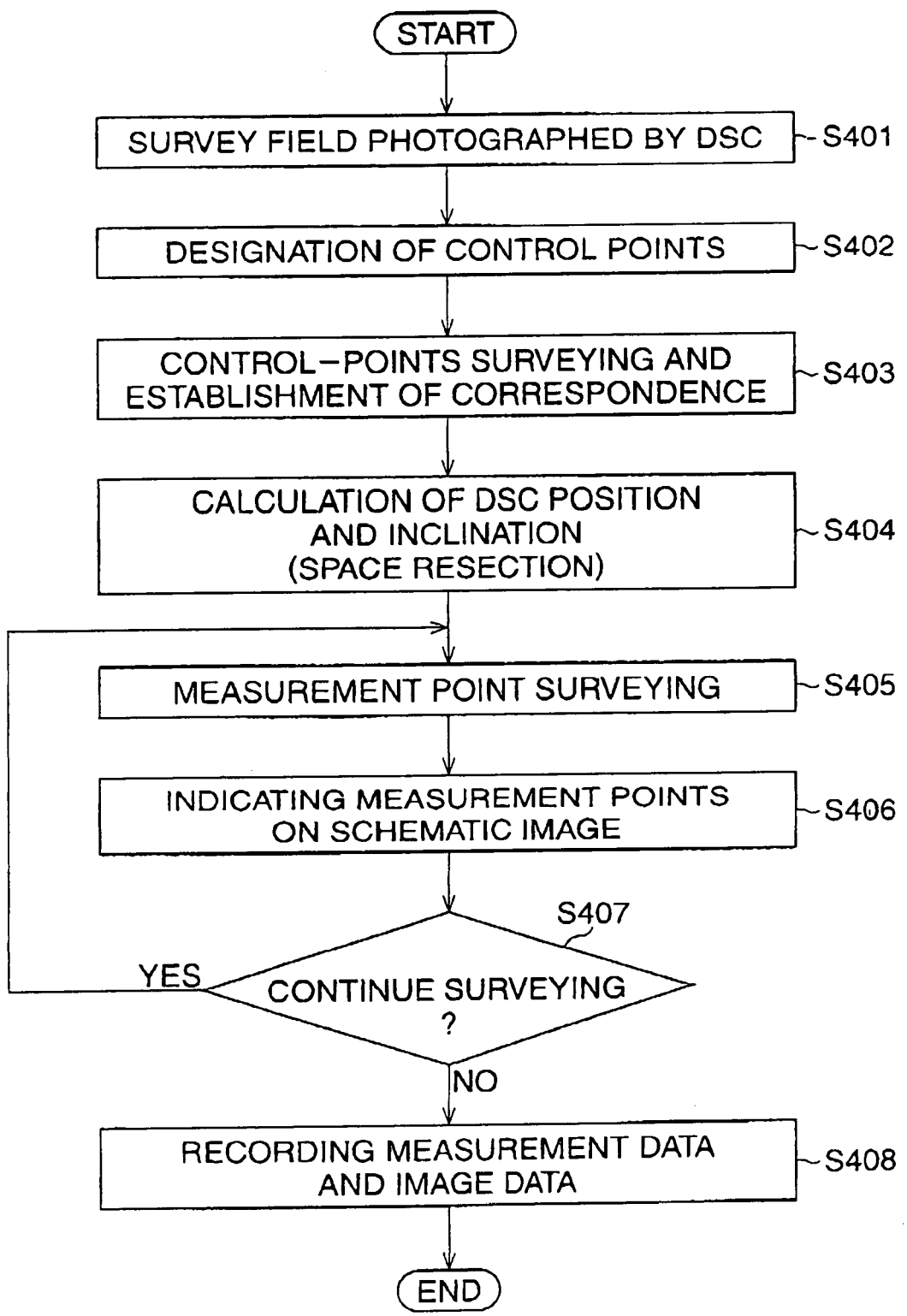
FIG. 12 is a flowchart of the measurement point indicating process of the third embodiment.
Figure 13:
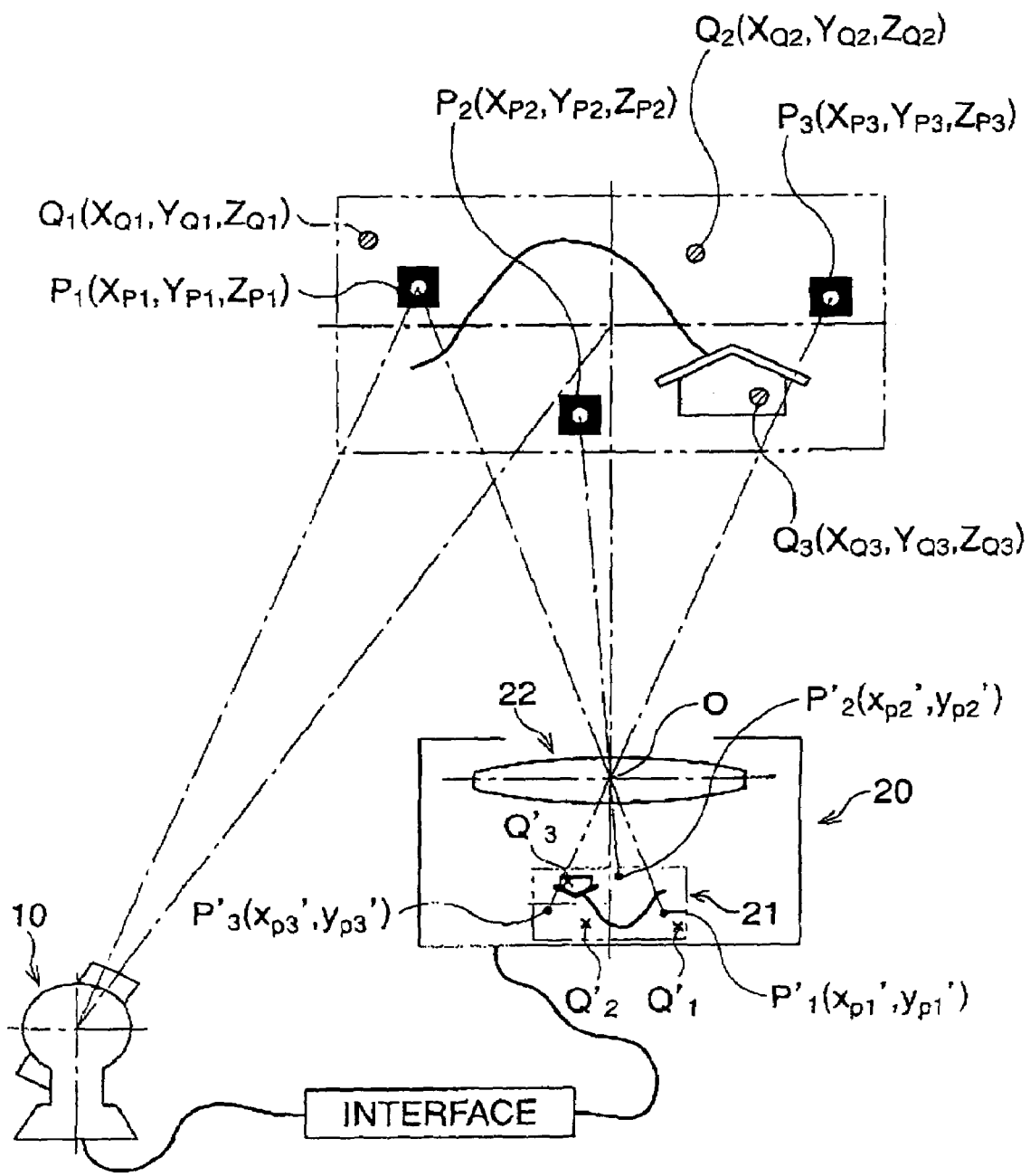
FIG. 13 schematically illustrates an arrangement of the surveying instrument and the camera in the third embodiment.

With reference to FIGS. 11, 12, and 13, a measurement point indicating process of the third embodiment will be explained. FIG. 12 is a flowchart of the measurement point indicating process of the third embodiment, and FIG. 13 schematically illustrates the arrangement of the surveying instrument and the camera in the surveying system of the third embodiment.

The procedures from Step S401 to Step S404 are the same as those in Step S101 to Step 104 in FIG. 2. In Step S405, an operator surveys a measurement point $Q_1$ with the surveying instrument 10'. The measured values or data are transferred to the surveying-supporting device 400 through the interface. The surveying coordinates of the measurement point $Q_1$ are then calculated in the system control circuit 440 of the surveying-supporting device 400. In Step S406, the image coordinates $(xq_i', yq_i')$ of the image point $Q_1'$ on the schematic image, the image point that corresponds to the measurement point $Q_i$, are derived from the surveying coordinates of the measurement point $Q_1$ obtained in Step S405 and the exterior orientation parameters $(X_o, Y_o, Z_o, \omega, \phi, \kappa)$ and the inner orientation parameters $(f, D_2, D_4, D_6, N_1, N_2, X_C, Y_C)$ calculated in Step S404. A mark (may be a measurement point numeral, such as P1, P2, . . . , and the like) that indicates the measurement point $Q_i$ or the measurement values, is then superimposed at the position which corresponds to the image coordinates $(xq_i, yq_i)$, and is displayed on the display 43 of the surveying-supporting device 400.

When it is determined that the surveying operations will be continued, in Step S407, the operations from Step S405 to Step S406 are repeated. For example, when the measurement points $Q_2$ and $Q_3$ are measured by the surveying instrument 10', marks or numerals that indicate each of the measurement points $Q_2$ and $Q_3$ or their measured values are indicated on the schematic image, which is displayed on the display 43 of the surveying-supporting device 400, at the points corresponding to the image points $Q_2'$ and $Q_3'$ of the measurement points $Q_2$ and $Q_3$. On the other hand, when the surveying operation is complete, image data of the schematic image, inner and exterior orientation parameters of the camera, image coordinates (or position information that indicates a point on a schematic image; e.g. data that represents pixel position) of the image points $Q_1'$, $Q_2'$, and $Q_3'$, and oblique distances, vertical angles, and horizontal angles of the measurement points $Q_1$, $Q_2$, and $Q_3$, or measurement data (or measurement information), such as surveying coordinates, are associated and recorded in the recording medium 27 in Step S408. Then the measurement point indicating process using the surveying system of the present embodiment ends. Note that, the image data of the schematic image, image coordinate data (or data indicating the position of a pixel) of the measurement points, measurement data, and so on, may be stored in separate files or a single file.

Figure 14:
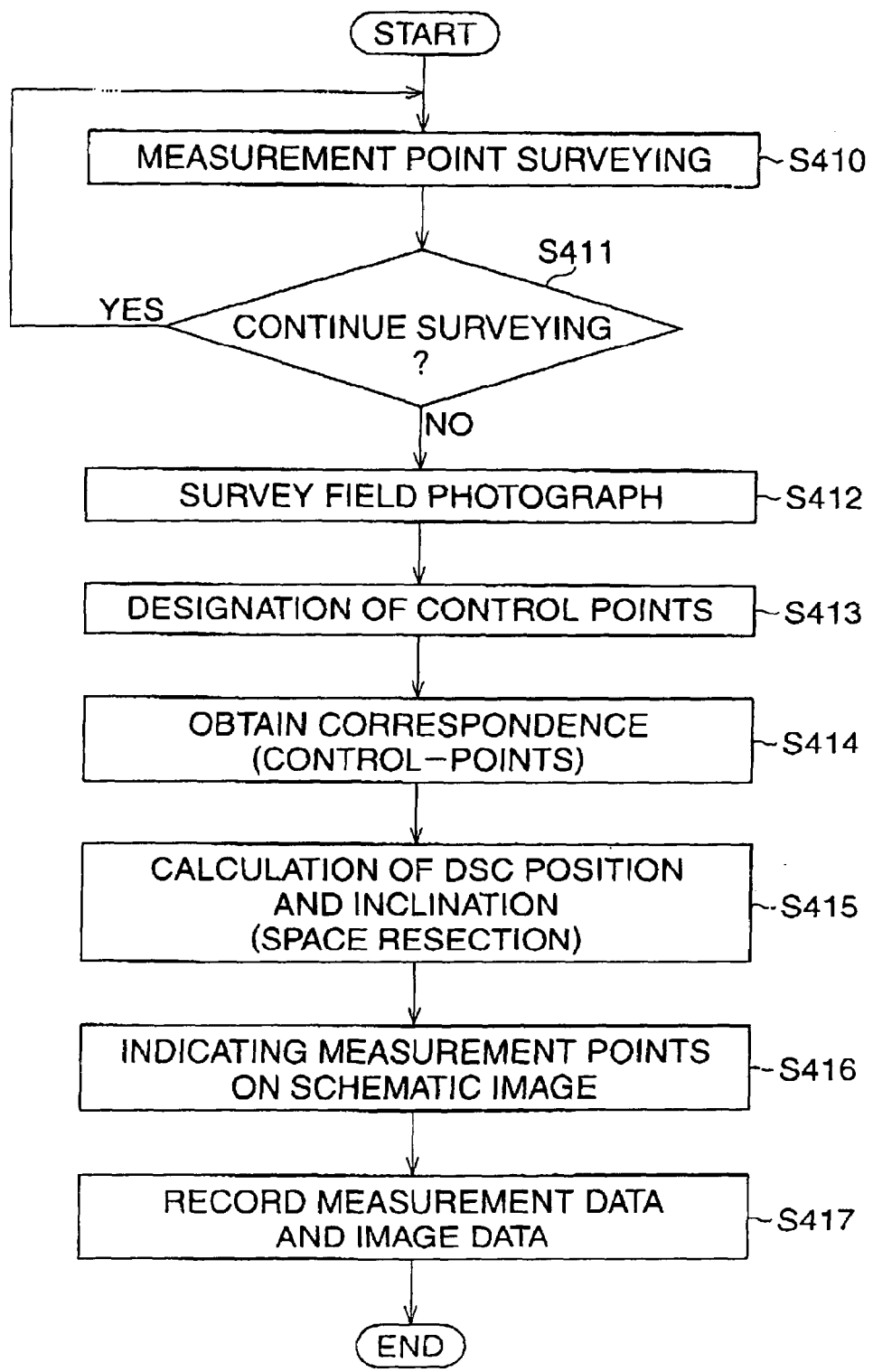
FIG. 14 is a flowchart of the surveying operation in an alternate embodiment.

Further, an alternate embodiment for the surveying system of the third embodiment will be described with reference to FIG. 14. FIG. 14 is a flowchart of the surveying operation in the alternate embodiment.

In the surveying operation described in FIG. 12, the position and the inclination of the digital still camera 20' in the surveying coordinate system are at first derived by means of space resection (S404), and then the measurement points are indicated on the schematic image individually each time the measurement point is measured. However, in this alternate embodiment, which is indicated by the flowchart of FIG. 14, the position and the inclination of the digital still camera 20' in the surveying coordinate system are derived after the completion of the measurement by the surveying instrument 10' for all measurement points, and then points corresponding to each of the measurement points are indicated on the schematic image simultaneously.

Namely, in Step S410 and S411, measurement of a plurality of measurement points is continuously carried out by using the surveying instrument 10'. When the measurement or surveying is complete, the digital still camera 20' captures a schematic image in Step 412, which includes the measurement points measured in Step S410. In Step S413, eleven arbitrary measurement points or pixels are selected from the measurement points indicated on the schematic image by an operator as control points by using the input device 41. The correspondence between the three-dimensional coordinates $(Xp_i, Yp_i, Zp_i)$ of the measurement points and the control points $P_i$ selected in Step S413 is made in Step S414 by the operator.

In Step S415, the position, the inclination, and the inner orientation parameters of the digital still camera 20' are calculated in accordance with the correspondence between the control points $P_1$ and the surveying coordinates obtained in Step S414 by means of the space resection, as well as Step S404 of FIG. 12. Image coordinates of the schematic image corresponding to every measurement point measured in Step S410 are then calculated, in Step S416, in accordance with the exterior and inner orientation parameters derived in Step S415. Further, marks that indicate the positions or measured values of the measurement points are superimposed on the schematic image and displayed on the display 43. In Step S417, each set of data is recorded in the recording medium 42, the same as in Step S408, and this is the end of the surveying operation of the present alternative embodiment Note that, in FIGS. 12 and 14, an image surrounding the surveying area or a schematic image is taken at Steps S401 and S412, however, an image taken previously may be used as a schematic image. Further, the surveying system may be developed to carry out image capturing and surveying simultaneously. This is achieved by adapting a system to link a switch in the switch group 14, which is for starting the surveying, and a DSC release switch in the switch group 29. Further, Steps S401–S404 may be carried out a day or more prior to Steps S405–S408. In this case, the surveying instrument must be positioned in the same place. Further, as described in the flowchart of FIG. 14, the surveying in Step S410 may have been carried out prior to carrying out the image composition with a schematic image. Furthermore, previously measured or given measurement data, including the data for the triangular marks, any type of map data, or geographical data, may be used, instead of carrying out the surveying operation of Step S410.

Note that, when the exterior orientation parameters $(X_o, Y_o, Z_o, \omega, \phi, \kappa)$ and the inner orientation parameters $(f, D_2, D_4, D_6, N_1, N_2, X_C, Y_C)$ of the digital still camera 20' are calculated using space resection, the image coordinates for the image point corresponding to a measurement point surveyed in Step S405 and Step S410 of FIG. 12 and FIG. 14 can be derived from Eq. (1) through Eq. (5) in accordance with the surveying coordinates obtained from the oblique distance, vertical angle, and horizontal angle, which are measured, and the exterior and inner orientation parameters obtained using space resection. In Step S406 and S416, a mark or measured value representing a measurement point is indicated at the point (pixel) corresponding to the measurement point on the schematic image in accordance with the image coordinates.

Figure 15:
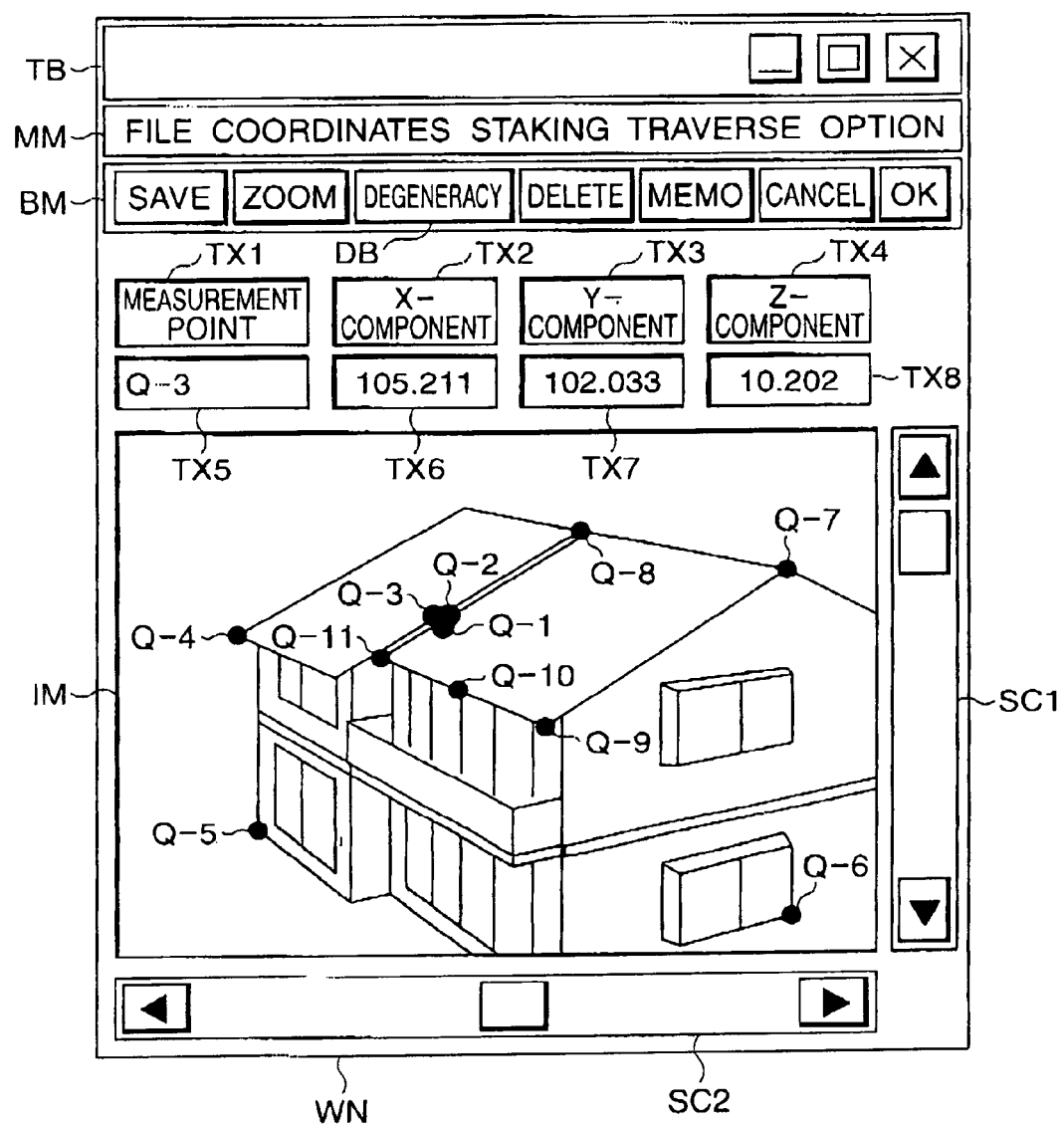
FIG. 15 shows the basic configuration of a window WN for indicating measurement points.
Figure 16:
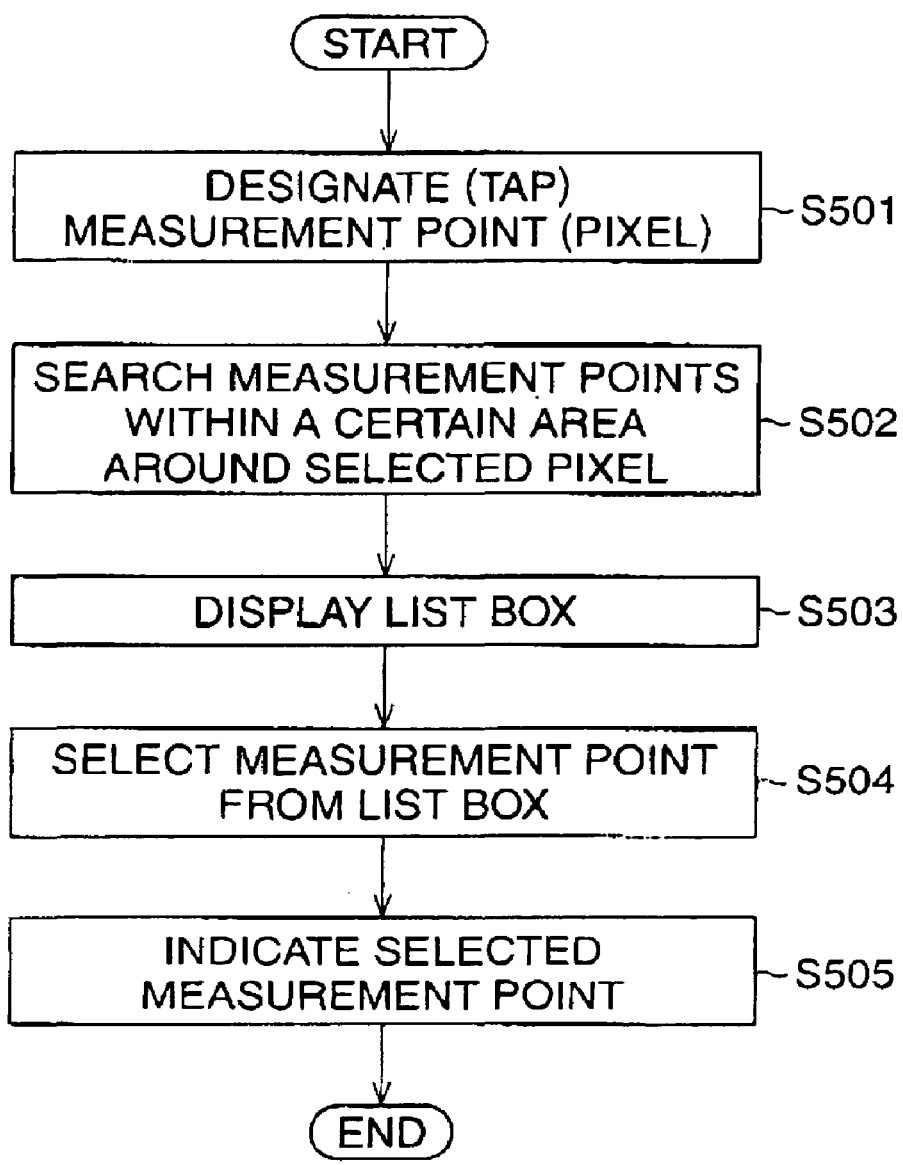
FIG. 16 is a flow chart of processes for indicating degenerated measurement points, in the third embodiment.

Next, with reference to FIG. 15 through FIG. 17, a method for indicating measurement points on the display 43 of the surveying-supporting device 400 in Steps 406 and 416 of FIGS. 12 and 13 is explained.

FIG. 15 shows the basic configuration of a window WN for indicating measurement points. On a title bar TB at the top of the window WN, a minimizing button, a maximizing button, and a closing button for the window WN are arranged. Beneath the title bar TB, a main menu MM is arranged. Further, beneath the main menu MM, a button menu BM with a plurality of buttons is arranged, and beneath the button menu BM, text boxes TX1–TX8 are arranged.

The text boxes TX1–TX8 are boxes for indicating surveying information relating to a measurement point. The text boxes TX1–TX4, arranged in the upper row, indicate items relating to the content that are indicated in the respective text boxes TX5–TX8, arranged in the lower row. In the text box TX5, the name or numeral of a measurement point is indicated. In the text boxes TX6–TX8, the values of X, Y, and Z coordinate components of the surveying data of the measurement point which is indicated in the text box T5, are respectively indicated.

Below the text boxes TX5–TX8, an image indicating area IM for indicating a schematic image is disposed. On the right hand side of the image indicating area IM, along the side of the image indicating area IM, a scroll bar SC1 for scrolling the schematic image upward or downward is arranged. Further, along the bottom side of the image indicating area IM, a scroll bar SC2 for scrolling the schematic image rightward or leftward is arranged.

On the schematic image displayed within the image indicating area IM, measurement points Q-1 to Q-11, which are already measured, are indicated as black circles, for example. However, when a plurality of measurement points exist on or about the same visual line, the positions of each measurement point concentrate to one pixel, so that discrimination of each measurement point becomes difficult. Further, when measurement points are densely positioned, for example the measurement points Q1–Q3, the pixels corresponding to these measurement points are made adjacent or nearby, thereby discrimination of each measurement point becomes difficult. Namely, even when the measurement points are separate in three-dimensional surveying data, each having different coordinates values, the measurement points (or marks representing the measurement points) are overlapped or piled up on the two-dimensionally projected schematic image. Therefore, some of the measurement points vanish from the schematic image (this condition will be referred to as degeneracy in the following).

Accordingly, in the third embodiment, degenerated measurement points are indicated in the manner shown in a flowchart of FIG. 16.

In Step S501, a point (e.g. a pixel) within the image indicating area IM is designated by the pointing device (input device 41) by an operator. Further, a degeneracy button DB in the button menu BM is clicked and set in the ON state. For example, a touch panel or pointing pen is used as the pointing device. Namely, one of the pixels within the image indicating area IM is tapped by the operator, using a pointing pen, and thus selected. In turn, the degeneracy button DB is tapped by the pointing pen, so that the successive processes from Step S502 are then executed.

In Step S502, pixels that correspond to measurement points are searched within a predetermined area around the pixel that is designated and selected by the pointing pen. In Step S503, the names of detected measurement points and their three-dimensional coordinates values are listed on the display 43, in the form of a list box shown in FIG. 17 (at the same time other information relating to the measurement points may also be listed). The value of the above three-dimensional coordinates may be expressed in the surveying coordinate system or the camera coordinate system. The coordinate system, which is referred to when listing the coordinate values, can be switched by a predetermined operation. Further, the listing order of the measurement points may be decided in accordance with each coordinate component value of the measurement points in the depth direction which depends on the selected coordinate system. Further, the above list may be made for each coordinate system. In Step S504, a measurement point is selected from the list box by an operator, using the pointing pen. In Step S505, only the mark corresponding to the measurement point that is selected in Step S504 is indicated inside the image indicating area IM of FIG. 15. At the same time, the name and the three-dimensional coordinate values for the measurement point are indicated in the text boxes TX5–TX8, respectively. After this, the present process ends.

Note that, the coordinate values described in the text box TX5–TX8 and the list box of FIG. 17 are chosen only for convenience, so that they don't correspond to the actual geometrical arrangement of the measurement points indicated in the image indicating area IM. This is true for relations between the position of a measurement point and coordinate values in all of the following embodiments.

As described above, according to the third embodiment, even when a plurality of measurement points exist in the same visual direction and are thereby degenerated on the schematic image, oversight or failure in surveying a measurement point is prevented, since the list of the measurement points, which are projected within the area possibly degenerated, are displayed, when an operator designates one of the pixels in the degeneracy area. Further, even when a plurality of measurement points are degenerated on the schematic image, the position of a measurement point can be suitably recognized through visual and numerical aspects, since the position of the measurement point which is selected from the list is indicated on the schematic image and its three-dimensional coordinates are also indicated on the screen.

Next, with reference to FIG. 15 and FIG. 18, a fourth embodiment of the present invention will be explained. The configurations of the fourth embodiment are the same as those in the third embodiment, except for the way of expressing the degenerated measurement points.

Figure 18:
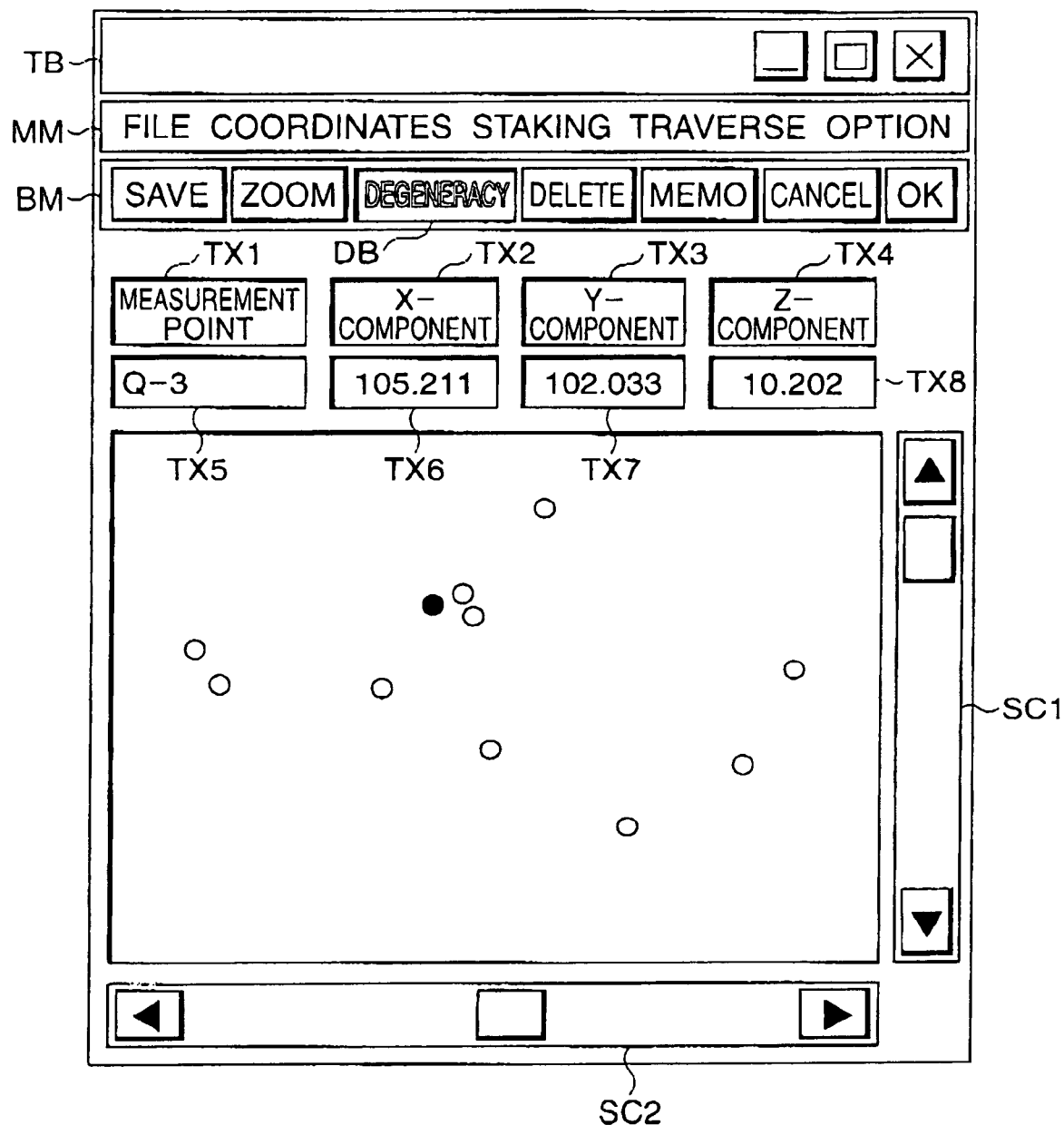
FIG. 18 is a horizontal plan view of measurement points that are used for indicating measurement point degeneracy, in the fourth embodiment.

In the fourth embodiment, as shown in FIG. 18, measurement points are projected on a horizontal plane and their arrangement is displayed in the image indicating area IM as a plan view, when the degeneracy button DB is tapped by an operator. Note that, the projection of each measurement point onto the horizontal plane is based on the three-dimensional coordinates of each measurement point. Although when the measurement points are degenerated on the schematic image, they may not be degenerated on the horizontal plane (particularly when the degeneracy is caused by the measurement points disposed in the same visual direction), so that an operator can distinguish each of the measurement points. Further, when a measurement point is designated on the horizontal plane, the name or numeral of the measurement point and its three-dimensional coordinate values are also indicated in the text boxes TX5–TX8.

As described above, according to the fourth embodiment, the effect similar to the third embodiment is provided. Further, in the fourth embodiment, since measurement points are indicated on the horizontal plane, the arrangement of the measurement points, which are degenerated on the schematic image, can be spatially recognized much easier.

Note that, measurement points can also be projected onto an arbitrarily designated plane, such as a vertical plane, so that the arrangement of the degeneracy measurement points is indicated on the designated plane in place of a horizontal plane.

Figure 19:
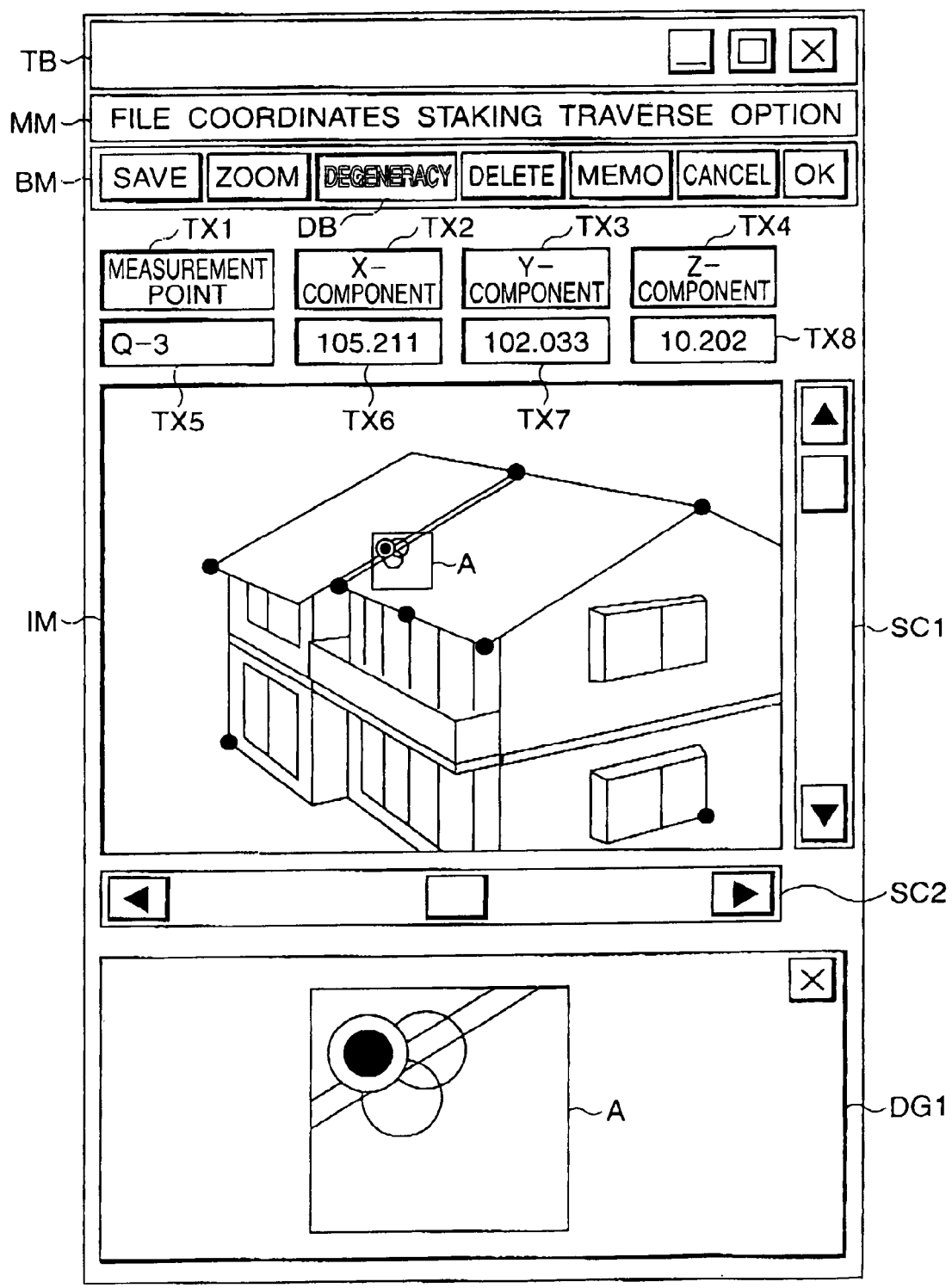
FIG. 19 is an example of a window used for indicating an enlarged image of a degenerated area in the fifth embodiment.

Next, with reference to FIG. 15 and FIG. 19, a fifth embodiment of the present invention will be explained. The configuration of the fifth embodiment is the same as that in the third embodiment, except for how it expresses degenerated measurement points.

In the fifth embodiment, an operator designates an area including the degenerated measurement points on the screen of FIG. 15 with the pointing pen, for example. Examples of the designated area are a rectangle, a circle, and the like. In FIG. 19, the designated area is shown as a rectangular area. When two points inside the image indicating area IM are designated by the operator by using the pointing pen, a rectangular area "A", of which the diagonal is defined by these two points, is determined.

When the area "A" including the degenerated measurement points (e.g. empty white circle) is determined, the frame surrounding the area "A" is indicated. Further, when the degeneracy button DB is tapped, a dialog box DG1 appears b neath the scroll bar SC2, so that the enlarged rectangular area "A" is displayed in the dialog box DG1. When a measurement point is selected from the enlarged image in the dialog box DG1, the indication of the selected measurement point is altered and discriminated from the other measurement points. Cooperatively, the name of the selected measurement point and its three-dimensional coordinate values are indicated in the text boxes TX5–TX8. Further, the indication of the selected measurement point in the schematic image of the image indicating area IM is also altered (e.g. from a white or empty circle to a double circle of which inner circle is black).

As described above, according to the fifth embodiment, the effect similar to the third embodiment is provided. Further, in the fifth embodiment, the designated area is enlarged and then indicated, so that it is effective even when the measurement points are densely arranged in the substantial or object space.

Note that, area "A", which is designated by a frame, may be configured so it can be dragged. Further, as in the fifth embodiment, a predetermined area around a designated pixel may be enlarged. In this case, the frame for area designation is negligible.

Figure 20:
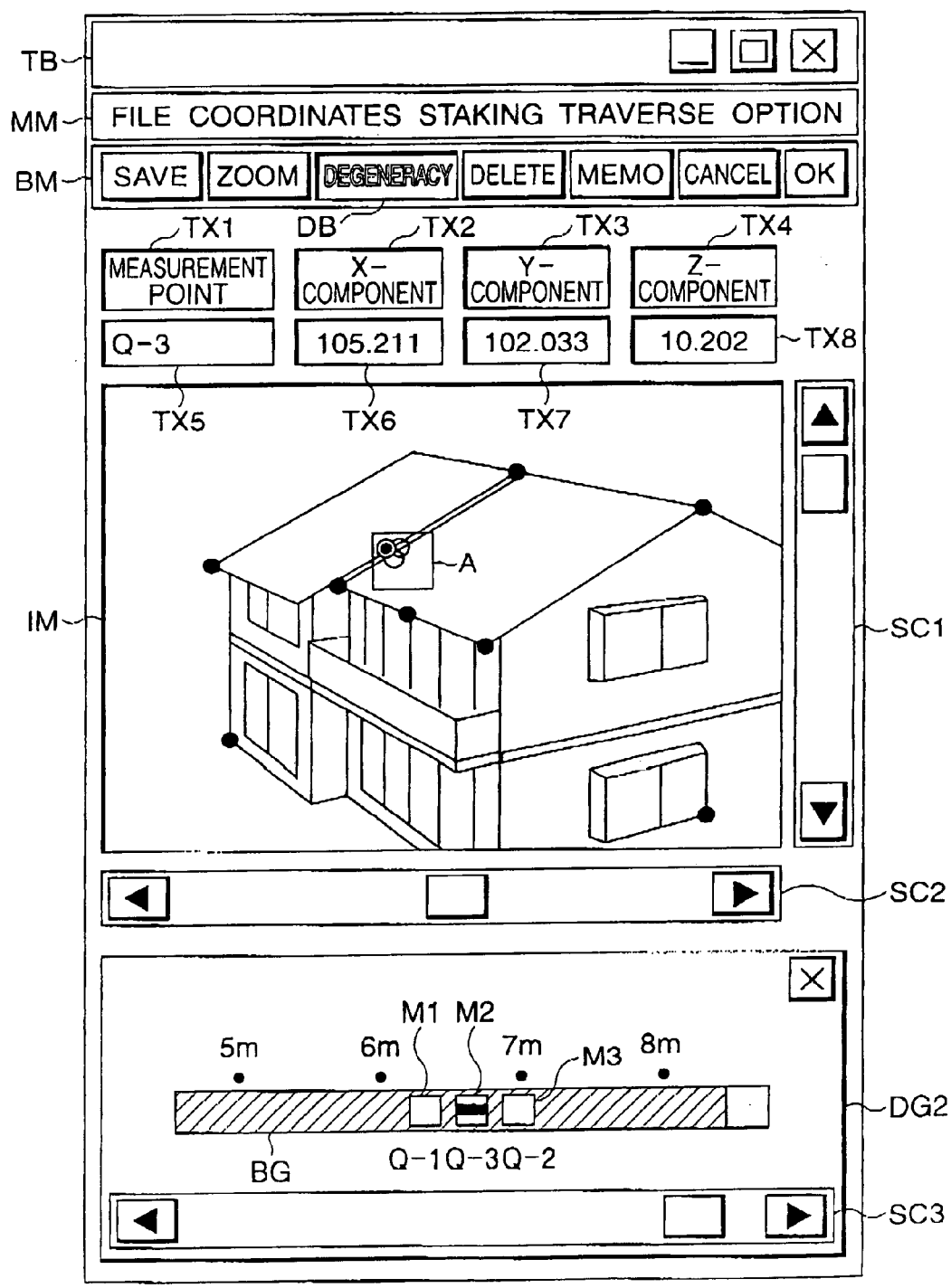
FIG. 20 is an example of a window, in the seventh embodiment, for indicating degeneracy of measurement points in the sixth embodiment.

Next, with reference to FIG. 15 and FIG. 20, a sixth embodiment of the present invention will be explained. The configuration of the sixth embodiment is the same as that in the third embodiment, except how it expresses degenerated measurement points.

In the fifth embodiment, the dialog box DG1, which indicates an enlarged image of the designated area "A", appears when the degeneracy button DB is in the ON state after the designation of the area "A". However, in the sixth embodiment, instead of the dialog box DG1, a dialog box DG2 appears when the area "A" is designated and the degeneracy button DB is operated. The dialog box DG2 represents the positional relation among the measurement points, which exist inside the designated area "A", by a bar graph BG, in accordance with the distance (coordinate) of each measurement point in the image depth direction Above the bar graph BG, a scale in the depth direction (e.g. 5 m or 6 m) is indicated along the bar. Inside the bar graph BG, boxlike marks (e.g. M1, M2, and M3) that correspond to each of the measurement points inside the area "A" are indicated. Beneath the bar graph BG, the names or numerals corresponding to each of the measurement points (e.g. Q-1, Q-2, and Q-3) are indicated for each of the marks (e.g. M1, M2, and M3), which are indicated inside the bar graph BG.

A hatched area inside the bar graph GB indicates the range in the depth direction that is indicated in the dialog box DG2. Namely, only measurement points, having a coordinate value of the depth direction within the hatched range, are indicated inside the bar graph. The range (hatched area) is controllable by a scroll bar SC3 arranged beneath the bar graph BG, for example. Although, in FIG. 20, the maximum of the indication range (hatched area) is designated by the scroll bar SC3, the minimum may be designated in place. Note that, the minimum and the maximum of the indication range (hatched area) may be designated by a numeral input using text box/boxes. Further, the scale, which is referred to by the bar graph, may also be enlarged/reduced. Namely, in FIG. 20, the range of the bar graph BG is preset in the rage from a little less than 5 m to a little more than 8 m, it can be enlarged to the range from 6 m to 7 m, for example.

When a mark (e.g. M2) corresponding to a the measurement points (e.g. Q-3) is selected from the measurement points indicated inside the bar graph BG, the indication of mark (M2) is altered to a mark that is dissimilar from the other marks (M1, M3). In the present embodiment, a cross bar is added to the center of a white empty box. Cooperatively, the name or numeral of the selected measurement point and its three-dimensional coordinate values are displayed in the text boxes TX5–TX8. Further, the indication of the selected measurement point in the schematic image of the image indicating area IM is also altered.

As described above, according to the sixth embodiment, an effect similar to the third embodiment is provided.

Figure 21:
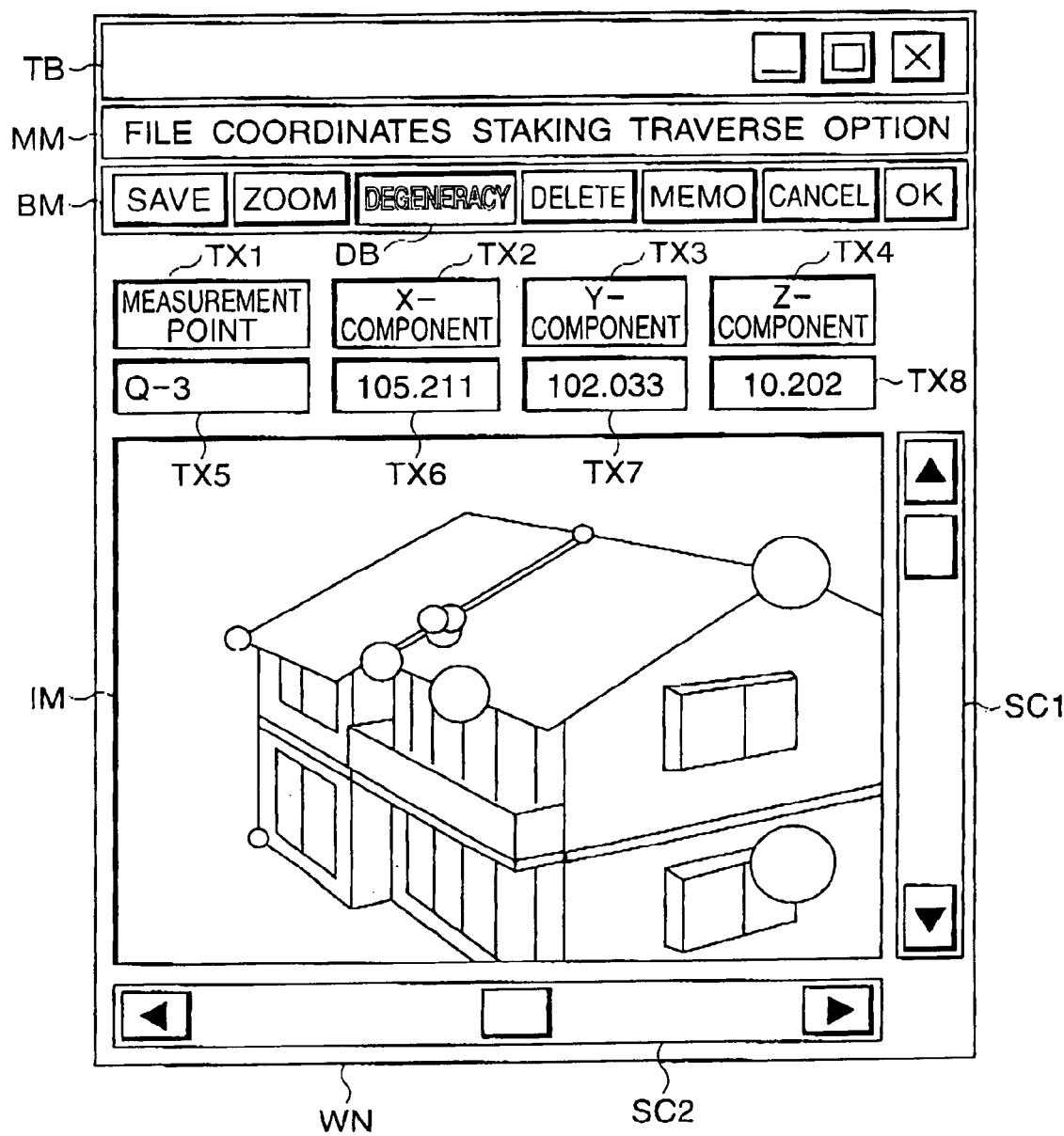
FIG. 21 is an example of a window when the degeneracy of measurement points is directly indicated on the schematic image.
Figure 22:
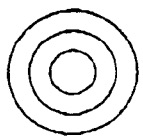
FIG. 22 is an example of marks for degenerated measurement points when a plurality of measurement points is positioned on the same gazing line.

With reference to FIG. 15, FIG. 21, and FIG. 22, a seventh embodiment of the present invention will be explained. The configuration of the seventh embodiment is the same as that in the third through sixth embodiments, except for how it expresses degenerated measurement points.

The seventh embodiment provides a way to indicate the degenerated measurement points on the schematic image displayed in the image indicating area IM directly. For example, when the degeneracy button DB is tapped on the window WN of FIG. 15, the schematic image in the image indicating area IM is replaced by the image shown in FIG. 21.

A measurement point is described by a circle having a diameter corresponding to the coordinate value along the depth direction of the image. For example, the diameter of a circle increases or decreases proportional to the value of the coordinate along the depth direction. When two or more than two circles overlap, the smaller circle is superimposed onto the larger circle, as shown in FIG. 21. Further, when a plurality of measurement points is positioned on the same visual line, they are represented by a plurality of concentric circles, as shown in FIG. 22. For example, when an operator selects a pixel around a degeneracy area of the schematic image, as in the third embodiment, measurement points within a predetermined range around the selected pixel are searched. The measurement points detected within the range around the selected point are then stored in a memory inside the system control circuit 440, and the measurement point which is nearest to the camera is selected. Namely, the name or numeral and three-dimensional coordinate values for the measurement point closest to the camera are displayed in the text boxes TX5–TX8 When the operator further taps a pixel within the selected area or range, a further measurement point is selected from the measurement points stored in the memory, in turn, and the name or numeral and its coordinate values are displayed in the text boxes TX5–TX8. This process is cyclically carried out, so that when it reaches the farthest measurement point and another tap is made, the nearest measurement point is again selected.

Figure 23:
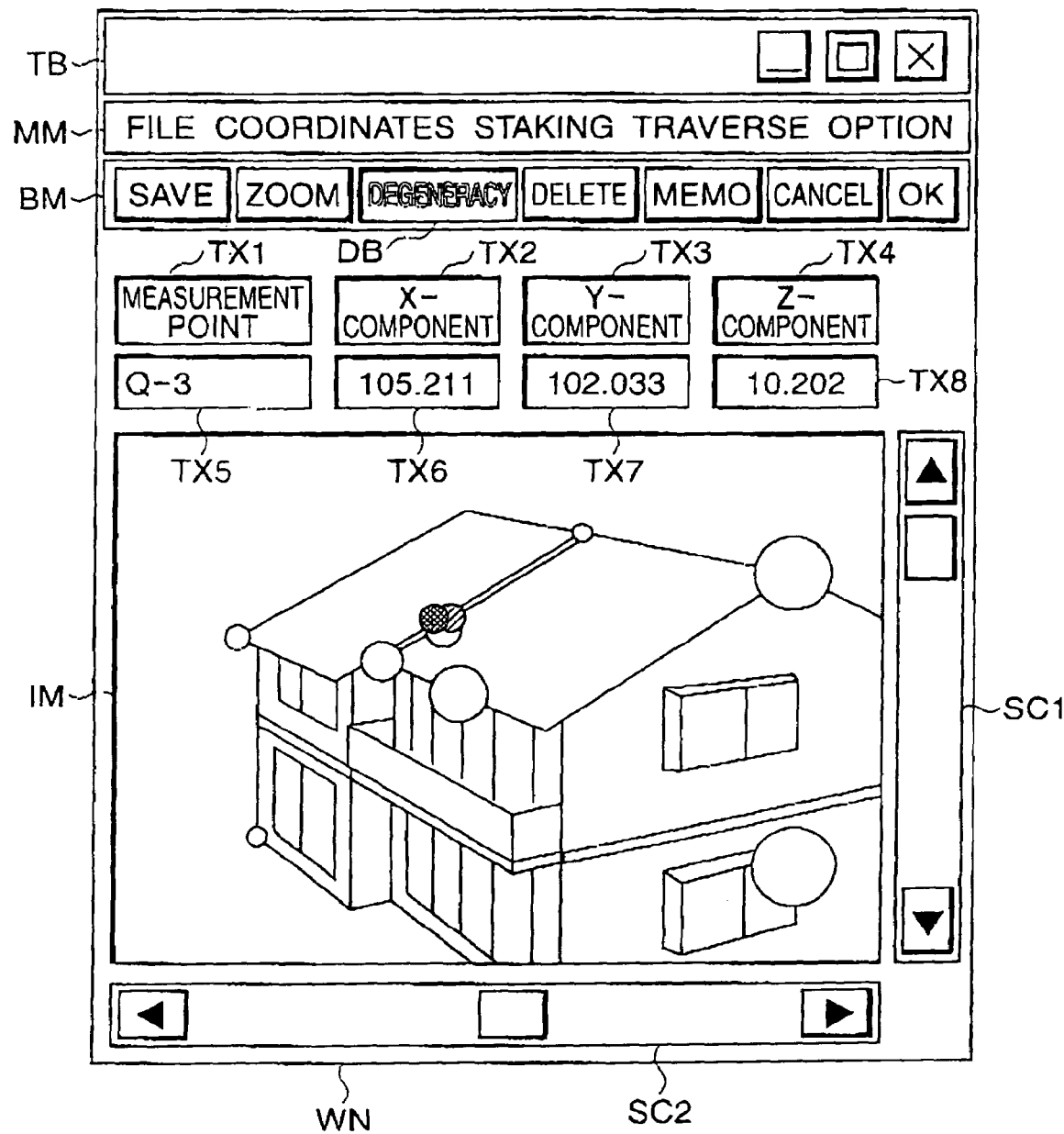
FIG. 23 is an example of a window, in an alternate embodiment of the seventh embodiment, when the degeneracy of measurement points is directly indicated on the schematic image.
Figure 24:
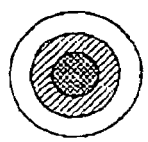
FIG. 24 an example of marks for degenerated measurement points in FIG. 23, when a plurality of measurement points is positioned on the same gazing line.

With reference to FIG. 23 and FIG. 24, an alternate embodiment of the seventh embodiment will be explained. In FIG. 23, the circles are filled with different colors when a plurality of circles overlaps because of degeneracy. Further, when a plurality of circles is positioned on the same visual line, they are indicated as shown in FIG. 24. In this case, the colors, which are used to fill circles, may be preset to a predetermined graduation of colors. For example, the color becomes gradually dark as the value of the coordinates along the depth direction increases or decreases. Note that, the remaining configurations are the same as those in the seventh embodiment.

As described above, according to the seventh and its alternate embodiment, an effect similar to the third through sixth embodiments is provided. Further, in the seventh and its alternate embodiment, the degeneracy area is directly represented on the schematic image, so that an operator can easily recognize the degeneracy area of measurement points on the schematic image. Further, in the alternate embodiment, each of the circles is represented by a separate color, so that each of the measurement points can be designated much easier.

Note that, in the seventh embodiment, a measurement point is selected from the measurement points stored in sequence in the memory; the selection may be carried out by direct designation of a circle by using a pointing pen or the like.

Figure 25:
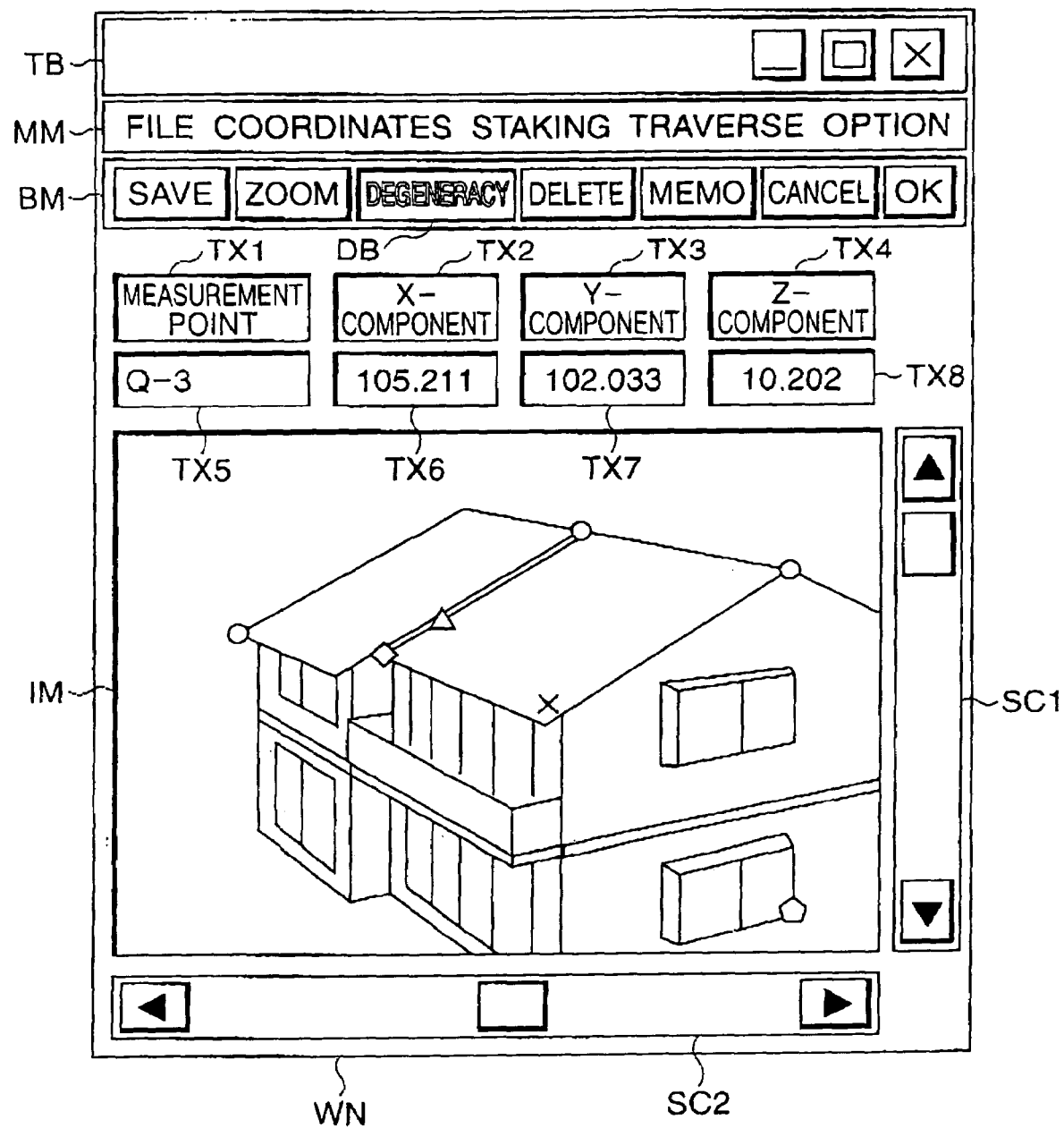
FIG. 25 is an example of a window, in the eighth embodiment, when the degeneracy of measurement points is directly indicated on the schematic image.

Next, with reference to FIG. 25, an eighth embodiment of the present invention will be explained. The eighth embodiment is similar to the seventh embodiment and FIG. 25 corresponds to FIG. 21 or FIG. 23 of the seventh embodiment. Although in the seventh embodiment, degenerated measurement points are represented by circles having different diameters on the schematic image, in the eighth embodiment, degeneracy of measurement points is represented by figures having different forms. For example, a non-generated measurement point is represented by a circle, when two measurement points are closely positioned and their marks overlap or are degenerated, they are represented by a mark "x", and when three or more measurement points are degenerated, they are represented by a polygon with the number of vertexes corresponding to the number of the degenerated measurement points. Each of the vertexes may correspond to each of the measurement points degenerated in the area, so that when an operator designates one of the vertexes with the pointing device, the name or numeral and three-dimensional coordinat values corresponding to the vertex are displayed in the text boxes TX5–TX8. Further, each side of the polygon may correspond to each of the measurement points. For example, from the top side and moving in the clockwise direction, each of the sides may correspond to the nearest to the farthest measurement point, so that the name or numeral and three-dimensional coordinate values are displayed according to the selection of the side. Note that, FIG. 25 only shows an example of an indicating method of the present embodiment, and the polygons depicted in FIG. 25 do not have consistency with the number of the measurement points depicted in FIG. 15.

Figure 26:
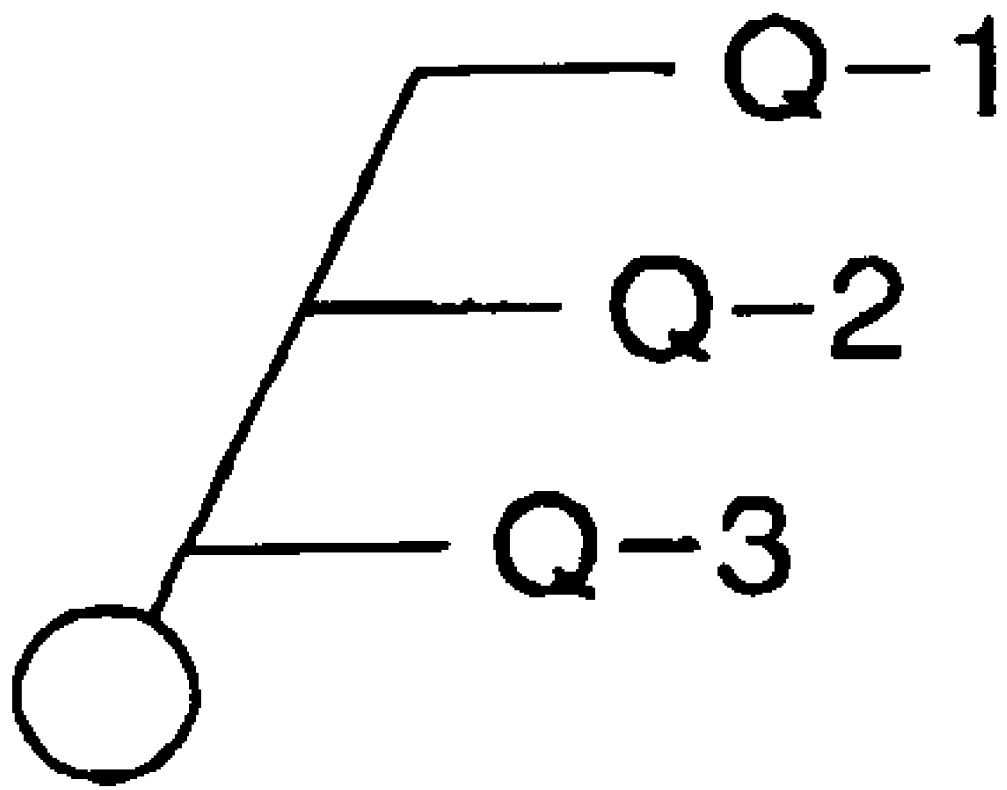
FIG. 26 is an alternate embodiment of the eighth embodiment for indicating degenerated measurement points.

FIG. 26 describes an alternate embodiment of the eighth embodiment for representing the degeneracy. In FIG. 25 of the eighth embodiment, different figures are used to represent each separate set of degenerated measurement points on the schematic image, however, in the alternate embodiment, a position representing a set of degenerated measurement points is indicated by a circle while the number of the degenerated measurement points is represented by the number of fletching lines drawn out from the circle. The above position may be defined by the average of positions of the measurement points included in the set, and each of the fletching lines may correspond to each of the measurement points, respectively, so that the name or numeral of each degenerated measurement point is indicated at the end of each fletching line. When an operator designates one of the fletching lines, the name or numeral and the three-dimensional coordinate values are indicated in the text boxes TX5–TX8. Further, the position representing the degeneracy set may be switched to the position of the selected measurement point, when the measurement point is selected. Furthermore, for a singular measurement point (a measurement point which is not degenerated), only the name or numeral may be indicated.

As described above, according to the eighth embodiment, an effect similar to the seventh embodiment is provided.

Figure 27:
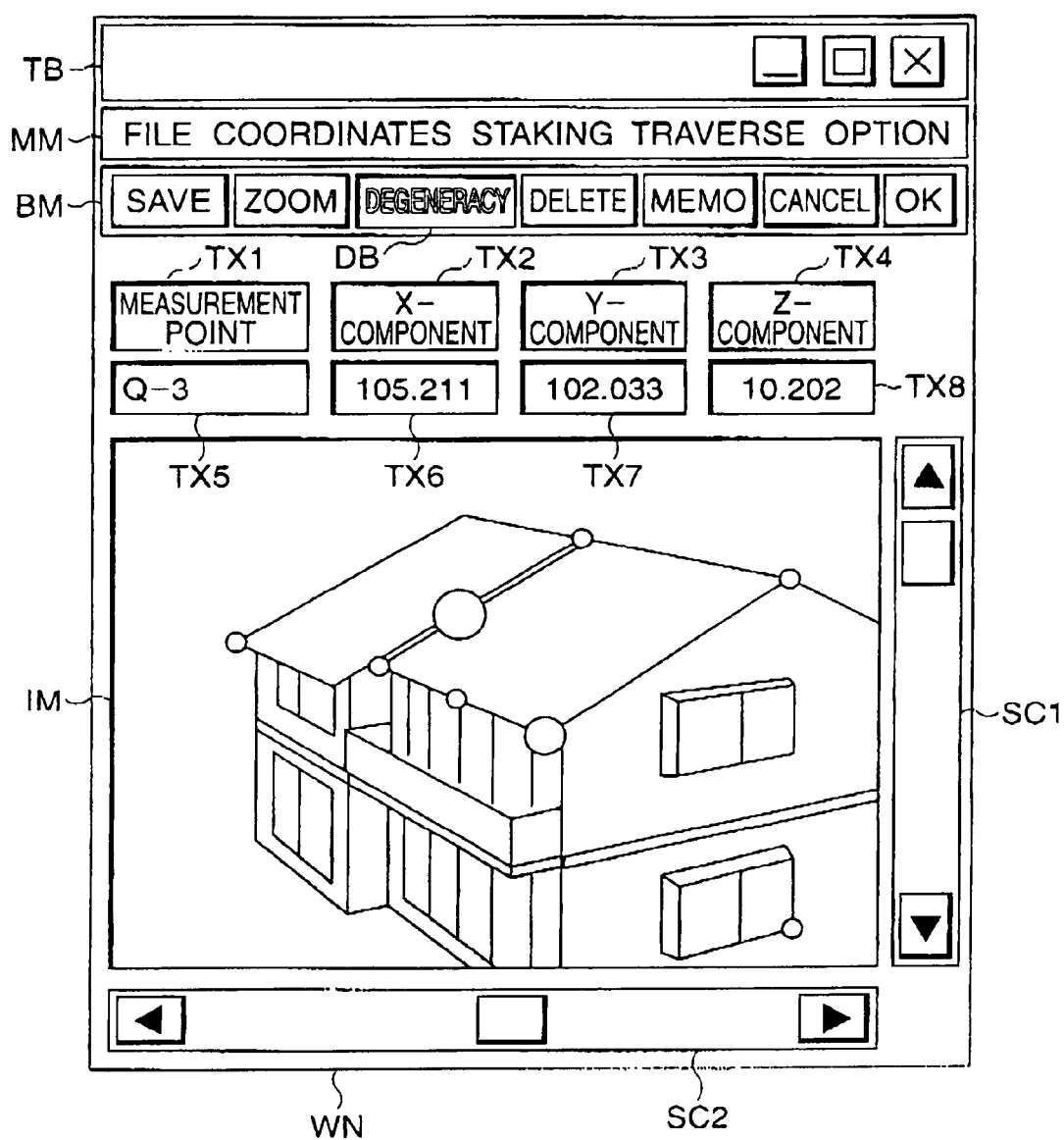
FIG. 27 is an example of a window, in the ninth embodiment, when the degeneracy of measurement points is directly indicated on the schematic image.
Figure 28:
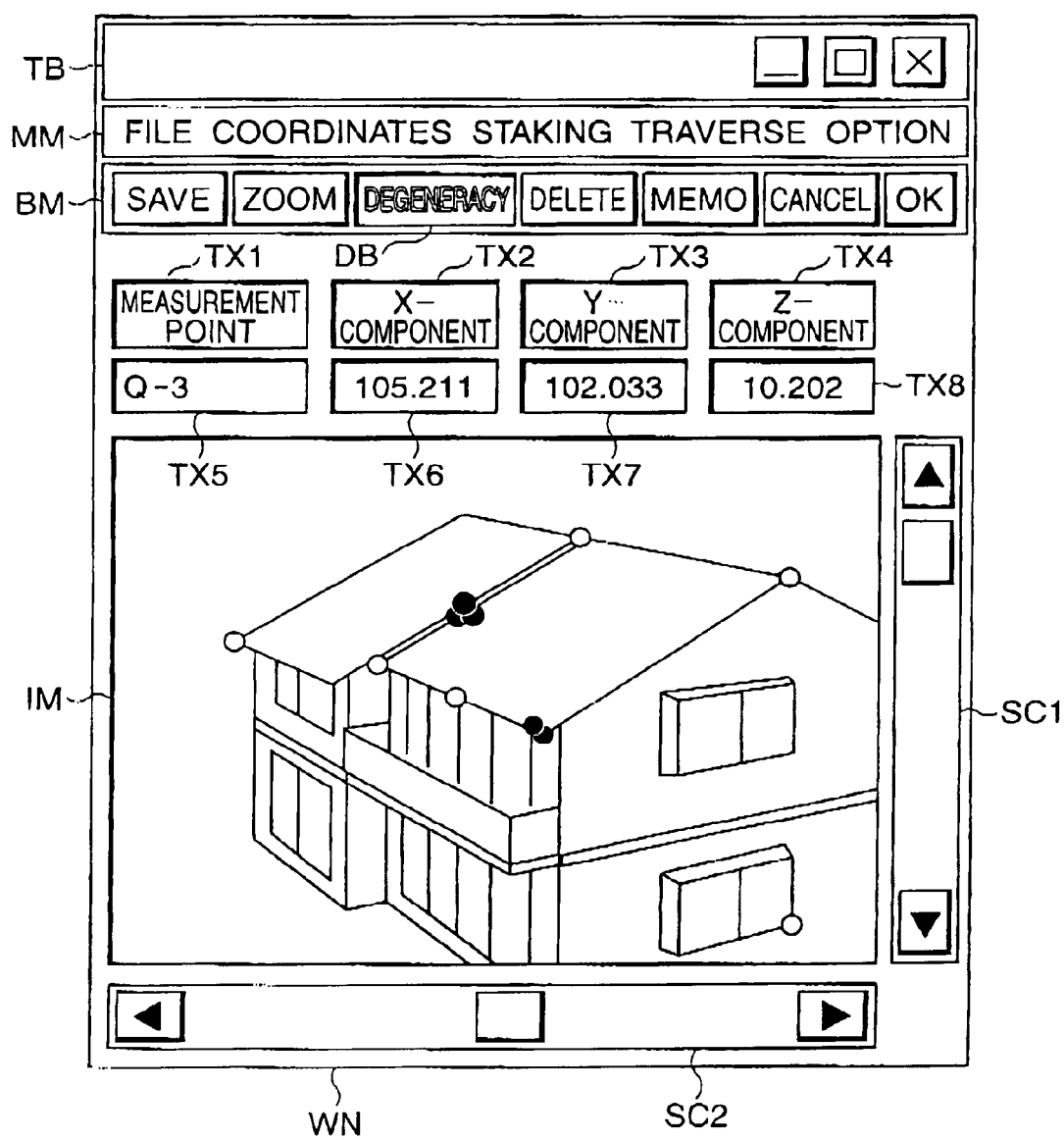
FIG. 28 is an alternate embodiment of the ninth embodiment for indicating degenerated measurement points.

With reference to FIG. 27 and FIG. 28, a ninth embodiment of the present invention will be explained. In the ninth embodiment, a mark (e.g. circle) which has a size corresponding to the number of degenerated measurement points is indicated at the center of the degenerated measurement points, when the degeneracy button DB is tapped, and when the measurement points are determined as one cluster or set of degenerated measurement points as a result of whether the distance between measurement points on the schematic image is within a predetermined range. Otherwise, marks having two different sizes may be used to indicate the existence or the degeneracy. Further, as an alternate embodiment, the color of the mark may be changed between a degenerated measurement point and a non-degenerated measurement point, as shown in FIG. 28. In FIG. 28, a degeneracy area is represented by a plurality of circles; it can also be indicated by one circle (e.g. the center at the average of two-dimensional coordinates of the measurement points included in the degeneracy set) representing the set of degenerated measurement points (not shown). Furthermore, as another alternate example, a singular measurement point and degenerated measurement points may be discriminated by dissimilar types of names when the names of measurement points are indicated beside each measurement point. For example, a singular measurement point and a degenerated measurement point can be discriminated by whether it is indicated by a capital letter or small letter, such that singular measurement points may be represented by $m_1$–$m_n$ and degenerated measurement points may be represented by $M_1$–$M_n$ (a suffix corresponds to the numeral of a measurement point).

As described above, according to the ninth embodiment, an effect similar to the eighth embodiment is also provided.

Although in the present embodiments, the control points are arbitrarily designated on the schematic image by using a pointing device, it is also possible to capture an image or a reference scale of which the dimensions are known, or reference marks at arbitrary positions with in the schematic image, and to calculate the exterior orientation parameters by regarding them as the control points In this case, the points on the reference scale or the reference marks may be designated on the schematic image by a pointing device or the like. Further, when the reference scale or the reference marks are applied the control points on the schematic image may be automatically detected by means of image processing.

In the present embodiments, a surveying instrument that can measure oblique distances and angles (vertical and horizontal angle), such as a total station, is listed as an example. However, any surveying instrument that can measure three-dimensional coordinates in a certain coordinate system can be applied. For example, a theodolite in combination with an electronic distance meter, a GPS, and so on, may be used as the surveying instrument. Further, the angular values are not restricted to an vertical and a horizontal angle, in fact any other type of angles may be used. For example, an angle produced between two arbitrary points in an oblique plane may be used.

In the third to ninth embodiments, the description is made for systems using a PDA, however, these functions provided by the PDA may be integrated with the surveying instrument or the digital still camera.

Further, although in the present embodiments, a digital image is obtained by a digital still camera, any type of image capturing device can be used as long as it can finally produce a digital image, such as a digital b video camera and the like.

In the third embodiment, a list of degenerated measurement points is indicated when it is determined that a plurality of measurement points is degenerated within an area around a selected pixel, instead, an alarm or a message to alert of a degeneracy may be used. Further, the indicating methods in the third to ninth embodiment can be used in combination with each other.

In the third to ninth embodiments, surveying information relating to a measurement point is surveyed by a surveying instrument. However, the above embodiment can be applied to a degeneracy that emerges when indicating points onto the schematic image; the points which are related to any type of given geographical data, position data of staking points for staking out surveying, or any point designated by an input device on the schematic image. Further, it can also be applied to degeneracy that emerges when the above-mentioned points and measurement points, which are surveyed by a surveying instrument, are simultaneously indicated on the same schematic image.

However, when surveying data are expressed in different coordinate systems, the coordinates of the surveying data may be previously transformed to a uniform coordinate system. The same is true with the case when indicating measurement points on the schematic image or when establishing correspondence between control points and the schematic image; for example, when indicating measurement points represented in different coordinate systems. Another example is when given surveying data are partly used as the control points and when the coordinate system for the given surveying data and the surveying coordinate system used in the substantial surveying field is different. In the above cases, the given surveying data may be transformed to the surveying coordinates. Further, opposite to the above, the data in the surveying coordinate system may be transformed to the coordinate system used in the given surveying data. Furthermore, these data may be transformed to an arbitrary coordinate system.

In the third to ninth embodiment, a size or color of a mark that represents a measurement point is changed depending on the distance from a digital still camera, it may be changed depending on the distance from a surveying instrument.

Further, in the second to ninth embodiment, position data of the measurement points or staking points are transmitted from a surveying instrument to a computer/surveying-supporting device via an interface cable; however, the position data may be input by using an input device, such as a keyboard and the like.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2002-185686 (filed on Jun. 26, 2002) and 2002-181225 (filed on Jun. 27, 2002) which are expressly incorporated herein, by reference, in their entirety.

The invention claimed is:

1. A surveying system, comprising:
a position relation calculating processor that calculates a positional relation between a coordinate system to which measurement information of a measurement point refers and a schematic image of a surveying field, in which said schematic image includes a staking point;
a correspondence establishing processor that establishes a correspondence between three-dimensional position information of said staking point and two-dimensional position information of a point corresponding to said staking point on said schematic image; and
an image processor that superimposes a symbol for indicating the position of said staking point on said schematic image in accordance with said correspondence,
wherein said correspondence establishing processor further establishes a correspondence between said measurement information of said measurement point and said two-dimensional position information of said point corresponding to said measurement point on said schematic image, and said image processor is able to indicate the position of said measurement point on said schematic image.

2. A system according to claim 1, further comprising a surveying device that is able to obtain said measurement information for said measurement point.

3. A system according to claim 2, wherein said positional relation is calculated from a relation between three-dimensional measurement information of control points which is obtained by said surveying device, and two-dimensional position information of a point corresponding to said control points on said schematic image, and wherein said control points are designated on said schematic image.

4. A system according to claim 2, wherein said surveying device comprises an image capturing device that is able to capture a magnified image which has a higher magnification relative to said schematic image, and wherein said magnified image of a sighting direction of said surveying device can be superimposed on said schematic image.

5. A system according to claim 1, wherein said measurement information of said measurement point comprises known measurement information.

6. A system according to claim 5, wherein said known measurement information comprises given geographical data, and said image processor superimposes a symbol for indicating the position corresponding to said given geographical data on said schematic image.

7. A system according to claim 1, wherein representation of said staking point before completion of a staking operation and after completion of said staking operation is different.

8. A system according to claim 1, wherein said image processor generates a plan view that indicates at least one of the relations between the position where said schematic image is captured, the position of said staking point, the position of said measurement point, and the position of said surveying device.

9. A system according to claim 1, wherein said image processor further superimposes secondary surveying information on said schematic image, and said secondary surveying information is derived on the basis of relations between said staking point and said measurement point.

10. A system according to claim 1, wherein said image processor further superimposes secondary surveying information on said schematic image, and said secondary surveying information is derived on the basis of relations between a plurality of said measurement points.

11. A system according to claim 9, further comprising
an image indicating device that indicates said schematic image on a screen; and
an input device that enables a designation of a point on said screen of said image indicating device;
wherein the positions of said staking points and said measurement points relating to said secondary surveying information are determined by designating at least two points from said staking points and said measurement points on said schematic image by using said input device.

12. A system according to claim 10, further comprising
an image indicating device that indicates said schematic image on a screen; and
an input device that enables a designation of a point on said screen of said image indicating device;
wherein the positions of said measurement points relating to said secondary surveying information are determined by designating at least two points from said plurality of measurement points on said schematic image by using said input device.

13. A system according to claim 1, further comprising an image indicating device, and said schematic image, on which a position of said staking point is indicated, can be displayed on a screen of said image indicating device.

14. A system according to claim 1, further comprising a printer, and said schematic image, on which a position of said staking point is indicated, can be printed.

15. A system according to claim 1, wherein said image processor superimposes a symbol for indicating a position of a target on said schematic image, and wherein said target is measured so as to carry out staking out surveying for said staking point.

16. A system according to claim 15, wherein said image processor superimposes a distance between said target and said staking point on said schematic image.

17. A system according to claim 15, wherein said image processor superimposes a direction in which said target should be moved for said staking out surveying, on said schematic image.

18. A system according to claim 1, wherein said image processor superimposes measurement information of said measurement point on said schematic image.

19. A system according to claim 1, further comprising an inner orientation parameter calculating processor that calculates inner orientation parameters of a camera which captured said schematic image, in accordance with a relation between measurement information of a plurality of control points and two-dimensional position information of said control points on said schematic image.

20. A system according to claim 19, further comprising,
an image indicating device that indicates said schematic image on a screen; and
an input device that enables a designation of a point on said screen of said image indicating device;
wherein a position of said control point is arbitrarily designated on said schematic image displayed on said screen by using said input device.

21. A system according to claim 1, wherein said positional relation is calculated from a relation between given three-dimensional measurement information of a plurality of control points and two-dimensional position information of said control points on said schematic image.

22. A system according to claim 1, wherein said image processor superimposes said three-dimensional position information of said staking point on said schematic image.

23. A system according to claim 1, further comprising a data recording processor that is able to associate and record said three-dimensional position information of said staking point, said measurement information of said measurement point, and image data of said schematic image.

24. A system according to claim 1, further comprising a personal digital assistant, wherein said personal digital assistant comprises said image processor.

25. A personal digital assistant which is used in a surveying system that comprises a position relation calculating processor that calculates a positional relation between a coordinate system to which measurement information of a measurement point refers and a schematic image of a surveying field, in which said image includes a staking point, and a correspondence establishing processor that establishes a correspondence between three-dimensional position information of said staking point and two-dimensional position information of a point corresponding to said staking point on said schematic image;
wherein said personal digital assistant comprises:
an image processor that superimposes a symbol for indicating the position of said staking point on said schematic image in accordance with said correspondence, said correspondence establishing processor further establishing a correspondence between said measurement information of said measurement point and two-dimensional position information of a point corresponding to said measurement point on said schematic image, said image processor indicating the position of said measurement point on said schematic image.

26. A digital camera, comprising:
an imaging device that captures a schematic image of a surveying field that includes a staking point, for staking out surveying with a surveying instrument;
a position relation calculating processor that calculates a positional relation between said schematic image and said surveying instrument in accordance with two-dimensional position information of a plurality of arbitrary designated control points on said schematic image, and one of three-dimensional measurement information of said plurality of control points measured by said surveying instrument and previously obtained measurement information;
a correspondence establishing processor that establishes a correspondence of three-dimensional measurement information of a measurement point measured by said surveying instrument, and of three-dimensional position information of said staking point, to two-dimensional position information on said schematic image which corresponds to each of said measurement points and said staking point; and an image indicator that indicates positions of said measurement point and said staking point on said schematic image, in accordance with said correspondence, wherein said correspondence establishing processor further establishes a correspondence between said measurement information of said measurement point and two-dimensional position information of a point corresponding to said measurement point on said schematic image, said image indicator indicating the position of said measurement point on said schematic image.

27. A digital camera according to claim 26, further comprising a data receiving processor that receives three-dimensional measurement information of a target, which is measured in order to carry out staking out surveying for said staking point, from said surveying instrument, and said image-indicating device indicates a position of said target on said schematic image.

28. A digital camera according to claim 27, wherein said image-indicating device indicates a distance between said position of said target and said position of said staking point.

29. A digital camera according to claim 27, wherein said image-indicating device indicates a direction in which said target should be moved for said staking out surveying, on said schematic image.

30. A digital camera according to claim 26, further comprising an input device that enables a designation of a point on a screen of said image indicating device, wherein a position of said control point is arbitrarily designated on said schematic image displayed on said screen by using said input device.

31. A surveying supporting device, comprising:
a position relation calculating processor that calculates a position relation between a coordinate system to which measurement information of a measurement point refers and a schematic image of a surveying field in which said schematic image includes a staking point; and a correspondence establishing processor that establishes a correspondence between three-dimensional position information of said staking point and two-dimensional position information of a point corresponding to said staking point on said schematic image, wherein an imager superimposes a symbol that indicates the position of said staking point on said schematic image in accordance with said correspondence, said correspondence establishing processor further establishing a correspondence between said measurement information of said measurement point and said two-dimensional position information of said point corresponding to said measurement point on said schematic image, said imager indicating the position of said measurement point on said schematic image.

32. A device according to claim 31, further comprising a data receiving processor that receives three-dimensional measurement information of a target, which is measured in order to carry out staking out surveying for said staking point, from said surveying instrument, and said imager indicates a position of said target on said schematic image.

33. A device according to claim 32, wherein said image imager indicates a distance between said position of said target and said position of said staking point.

34. A device according to claim 32, wherein said imager indicates a direction in which said target should be moved for said staking out surveying, on said schematic image.

35. A computer program for supporting surveying, comprising:
calculating a positional relation between a coordinate system to which measurement information of a measurement point refers and a schematic image of a surveying field, in which the schematic image includes a staking point;

calculating a correspondence between three-dimensional position information of said staking point and two-dimensional position information of a point corresponding to the staking point on said schematic image; and superimposing a symbol that indicates the position of the staking point on the schematic image in accordance with the correspondence, said correspondence further establishes a correspondence between the measurement information of the measurement point and the two-dimensional position information of the point corresponding to the measurement point on the schematic image, the position of the measurement point being indicated on the schematic image.

36. A surveying method, comprising:
capturing a schematic image of a surveying field including a staking point;
calculating a relation between said schematic image and a surveying instrument;
indicating a position of said staking point on said schematic image;
measuring three-dimensional measurement information of a target using said surveying instrument in order to carry out staking for said staking point;
indicating a position of said staking point on said schematic image, in accordance with said relation, for guiding said target to said staking point,
establishing a correspondence between said three-dimensional measurement information and two-dimensional position information of a point corresponding to said target on said schematic image, and
indicating the position of said target on said schematic image.

* * * * *